(12) United States Patent
Brinkmann

(10) Patent No.: US 6,567,927 B1
(45) Date of Patent: May 20, 2003

(54) LOGIC UNIT OPERABLE UNDER THE BYZANTINE ALGORITHM, COMPUTER UNIT HAVING SUCH LOGIC UNIT, COMPOSITE ASSEMBLY COMPRISED OF LOGIC UNITS OR COMPUTER UNITS, AND METHOD OF OPERATING SUCH AN ASSEMBLY

(75) Inventor: Volker Brinkmann, Weyhe (DE)

(73) Assignee: DaimlerChrysler Aerospace AG, Ottobrunn (DE)

( * ) Notice: Subject to any disclaimer, the term of this patent is extended or adjusted under 35 U.S.C. 154(b) by 0 days.

(21) Appl. No.: 09/565,139

(22) Filed: May 5, 2000

(30) Foreign Application Priority Data

May 7, 1999 (DE) .......................... 199 21 179

(51) Int. Cl.[7] .............................................. G06F 11/00
(52) U.S. Cl. ................. 714/10; 714/11; 714/3
(58) Field of Search ................. 714/10, 11, 3

(56) References Cited

U.S. PATENT DOCUMENTS

| | | | | |
|---|---|---|---|---|
| 4,593,396 A | * | 6/1986 | Anderson, Jr. ............... | 714/47 |
| 4,907,232 A | * | 3/1990 | Harper et al. ................. | 714/3 |
| 5,269,016 A | * | 12/1993 | Butler et al. .................. | 714/6 |
| 5,513,354 A | * | 4/1996 | Dwork et al. ............... | 709/106 |
| 5,533,188 A | * | 7/1996 | Palumbo ........................ | 714/4 |
| 5,598,529 A | * | 1/1997 | Garay et al. ................. | 714/11 |
| 5,727,210 A | * | 3/1998 | Dwork et al. ............... | 709/104 |
| 6,141,769 A | * | 10/2000 | Petivan et al. ................ | 714/10 |
| 6,178,522 B1 | * | 1/2001 | Zhou et al. .................... | 714/12 |
| 6,202,181 B1 | * | 3/2001 | Ferguson et al. ............ | 714/724 |
| 6,463,422 B1 | * | 10/2002 | Hangartner .................. | 706/14 |

FOREIGN PATENT DOCUMENTS

| | | | |
|---|---|---|---|
| DE | 4401168 | 8/1994 | |
| EP | 565915 A2 | * 10/1993 | ........... G06F/11/00 |

OTHER PUBLICATIONS

Lawrence Kesteloot, Byzantine Failures in Synchronous Systems, Jan. 20, 1995, http://tofu.alt.net/~lk/290.paper/node7.html.*

Lawrence Kesteloot, Optimizing Byzantine Agreements, Jan. 20, 1995, http://tofu.alt.net/~lk/290.paper/node10.html.*

"The Byzantine Generals Problem," Lamport et al., SRI International, ACM Transactions on Programming Languages and Systems, vol. 4, No. 3, Jul. 1982, pp. 382–401.

* cited by examiner

Primary Examiner—Nadeem Iqbal
Assistant Examiner—Timothy M. Bonura
(74) Attorney, Agent, or Firm—Nils H. Ljungman & Associates

(57) ABSTRACT

A logic unit operable under the Byzantine algorithm for the architectural configuration of a composite assembly which tolerates an amount of F errors in simultaneous manner as to time and a plurality of inputs for in-reading of data into registers of a set of registers, and a plurality of outputs for out-reading of data from the registers, whereby each output is connectable with an input of a further logic unit, whereby the registers are coupled with the inputs and outputs in such a manner that each register is capable of being read-in and being capable of being read-out independently of the position of the logic unit within the assembly, by means of a position invariant, relative identification, as well as a computer unit with such a logic unit, as well as the fault-tolerant assembly of such logic/computer units, and a method of operating a fault tolerant assembly.

19 Claims, 12 Drawing Sheets

LOGIC UNIT OPERABLE UNDER THE BYZANTINE ALGORITHM, COMPUTER UNIT HAVING SUCH LOGIC UNIT, COMPOSITE ASSEMBLY COMPRISED OF LOGIC UNITS OR COMPUTER UNITS, AND METHOD OF OPERATING SUCH AN ASSEMBLY

BACKGROUND OF THE INVENTION

1. Field of the Invention

This present invention may relate to a logic unit for the configuration of an architecture that is simultaneous-as-to-time and operable under the Byzantine algorithm and that tolerates a plurality F of faults, with a plurality of inputs for in-reading of data into registers of a set of registers and a plurality of outputs for out-reading of data from the registers, whereby each output is adapted to be connected with an input of a further logic unit. Furthermore, the present invention may relate to a computer unit with such logic unit, as well as to the fault tolerant assembly of at least 3F+1 logic units or computer units. Finally, the present invention may relates also to a method of operating a fault tolerant assembly with at least 3F+1 of such logic units or computer units with F+1 data distributing cycles.

2. Background Information

Fault tolerant computers of this type are known, for example, from German Patent No. 44 01 168 C2. They operate under the Byzantine algorithm as described in German Patent No. 44 01 168 C2, as well as in the paper by Leslie Lamport, Robert Shostak, and Marshall Pease, entitled "The Byzantine Generals Problem", ACM Transaction on Programming Languages and Systems (TOPLAS), Volume 4, Number 3, July 1982, pages 382–401. The Byzantine algorithm is comprised essentially of a redundant data processing with a plurality of computer units operating in parallel which under this algorithm distribute data, in a manner which will be explained in greater detail below, and compare the data. Fault tolerant computers of this type are comprised of an assembly of 3F+1 computer units RE1 to RE(3F+1). Such computer units are, for example, for F=1, in accordance with FIG. 5, connected to one another in such a manner so that each computer unit can directly exchange data with any other computer unit. By distribution into F+1 distribution cycles and verification of these data under the Byzantine algorithm, a fault-containing computer unit can hereby be recognized and deactivated, whereby the unaffected computer units continue to operate with valid data.

Each computer unit contains, for this purpose, one data storage DS1 to DS(3F+1). To make the basic problematic which is the base of the invention more clearly understood, the circuitry and procedures in such fault tolerant computers, on the basis of FIGS. 5, 5a, 5b and 5c of this application, will be briefly described for F=1, for example.

FIG. 5 of this application shows how, via process signal lines 1, 2, 3, 4, 5, process signals are passed to each computer unit RE1, RE2, RE3, RE4. Further data lines 6, 7, 8, 9, 10, 11 connect each computer unit with respectively one other computer unit. Each of these data lines 6–11 is comprised in detail of bi-directional connections for data and for deactivating signals and providing of clock pulse signals. The lines 1 to 11 shown in FIG. 5 are to be found in corresponding manner in the FIGS. 5a, 5b and 5c, but without reference numerals.

Each one of the four computer units RE1 to RE4 has a process interface PSS and a monitoring logic ÜL, as well as an application specific processor AP. The data storages DS1 to DS4 are part of the monitoring logic ÜL and serve for storing of in-read process data.

The original data produced in the computer unit or, respectively, data d1 to d4 in-read by a process interface PSS are initially taken up in the respectively associated data storages DS1 to DS4, in accordance with FIG. 5a.

Subsequently, each computer unit transfers, in a first data distribution cycle in accordance with FIG. 5b, its original data d1 to d4 to each other computer unit, into the associated data storage. At the conclusion of this distribution cycle, thus, each data storage contains, in accordance with FIG. 5a, the in-read, inherent data d1; d2; d3; d4, as well as the d1/RE1; d2/RE2; d3/RE3; d4/RE4 identified data, respectively, of the other computer units.

In a second data distribution cycle in accordance with FIG. 5c, each computer unit then transfers all data obtained according to FIG. 5b into the data storages of those two computer units which did not already obtain data in the original condition in accordance with FIG. 5a. Thus, at the conclusion of this distribution cycle, each data storage DS1, DS2, DS3 and DS4 contains its own or inherent data in accordance with FIG. 5a as well as, respectively, three blocks of data DB1, DB2 and DB3, whereby the original data di are contained in a transferred block of data of the three other computer units, respectively, from another one of the three computer units REi.

The evaluation is then carried out in each computer unit respectively through a first comparison of the three data within each block of data for bitwise identity, and in a second comparison of the blocks of data DB1 to DB3 among one another, as well as with the respective original data in accordance with FIG. 5a, for identity, whereby congruent (i.e., bit-identical) and quasi-congruent identity (i.e., identity within a tolerance range) can be differentiated. When through the subsequent evaluation of the results of comparison, by means of the known Byzantine algorithm, a fault-containing computer unit is identified, the computer unit then produces and transfers a deactivating signal to the computer unit identified as being fault-containing. When this computer unit receives from all three other computer units a deactivating signal, this computer unit is deactivated.

Known computer units or assemblies formed therefrom in accordance with German Patent No. 44 01 168 C2 have, however, the disadvantage that due to the differing contents of the data storages (compare FIG. 5c of this application), as well as the distribution and the comparison of the data on a logical plane or data stream at a level or plane above the individual data, there is required for each computer unit an individual data evaluation, which leads thereto so that known computer units or, respectively, assemblies configured thereof operate rather slowly, since the transfer and evaluation of the sets of data or data sentences require a high computing effort.

OBJECT OF THE INVENTION

One possible object of the present invention may be to provide a fault tolerant assembly of individual logic units or, respectively, computer units, these units per se, as well as a method of operating the assembly, being described above in this application, and which, respectively, operate essentially faster and essentially more reliably.

SUMMARY OF THE INVENTION

One possible embodiment of the present invention preferably teaches that this possible object can be accomplished with a logic unit of the type mentioned above in this application which is characterized thereby in that the registers are coupled with—each connected with one output—the inputs and outputs, and that each register is capable of being in-read and out-read, independently of the position of the logic unit within the assembly, by means of a position-invariant relative identification.

Furthermore, at least one possible embodiment of the present invention preferably teaches a computer unit with such a logic unit, as well as teaching a fault tolerant assembly of at least 3F+1 identically configured ones of such logic units or, respectively, computer units, whereby the inputs and outputs of the logic units or, respectively, computer units, are connected with one another, such that corresponding registers of various logic units or, respectively, computer units comprise data of like relative identification of the origin and of the transmitting computer unit.

Finally, at least one possible embodiment of the present invention preferably teaches a method of operating an assembly in accordance with the invention with at least 3F+1 logic units or computer units according to the invention, wherein F is the amount of faults that can be tolerated simultaneously-as-to-time, with F+1 data distributing cycles, whereby in-read data during in-reading and during distribution are identified with a relative identification, whereby the relative identification of the data in corresponding registers and various logic units or, respectively, computer units, is essentially identical.

Throughout this application, the letter or numeral i may designate the origin of data d, that is, in relative identification, the computer unit into which the data were originally in-read, while the letter or numeral j may designate that computer unit RE from which these data were transferred.

Throughout this application, the term "pertaining" may mean "corresponding."

The relative identification may allow, in an essentially advantageous manner, the combining of identical computer units or logic units in an assembly. This makes it possible to operate computer units or logic units of an assembly at any desired position within the assembly, without it being necessary that adaptations be made. Furthermore, at least one possible embodiment of the present invention may allow the data distribution and the required data comparison exclusively by way of hardware and not by means of software, such that a fault tolerant assembly, in contrast with known assemblies, can be operated substantially faster and more reliably.

Preferably each computer unit comprises an identical logic unit associated with it. For the special case of F=1, each logic unit may have respectively 10 hardware shift registers, three inputs, which can be connected for in-reading of data sets or data sentences via first switch-over devices, with nine of such registers, as well as a further input which serves for in-reading of the original process data. Furthermore, each logic unit may have three outputs which are connectable, via respectively a second switch-over device, with all registers. Thereby each output of each logic unit is connected, respectively, to an input of such other logic unit, in such a manner that the data which are read-in into the first register of each logic unit are transferred by a first data distribution cycle into a register of each other logic unit. In a subsequent, second, data distribution cycle, data obtained during the first cycle from all other computer units are transferred from each register set into the other two respective register sets, which in the prior cycle were not senders of the specific data. Thereby the characterization of data and of the logic units is done by relative identification and cyclic modulo 4 check. The data may be distributed in such a way that these same registers of all register sets respectively have the same relative origin and respectively from a register set were transferred with essentially the same relative identification.

In at least one possible embodiment of the present invention, it is preferred that each logic unit has a plurality of deactivating lines, by means of which deactivating signals can be passed to further logic units or, respectively, deactivating signals can be received by further logic units, in the event that a fault has been recognized. Upon a completed deactivation, a re-activation of a logic unit, which may be particularly preferred, can be initiated. During re-activation, as well as during the initial activation of each logic unit, the logic units may be synchronized with the aid of cyclic data communication.

Essentially advantageously on the basis of a deactivating status, it may be decided whether data of a further unit are also to be excluded from data distribution and data evaluation or whether they are to be included.

The above-discussed embodiments of the present invention will be described further hereinbelow with reference to the accompanying figures. When the word "invention" is used in this specification, the word "invention" includes "inventions", that is, the plural of "invention". By stating "invention", Applicant does not in any way admit that the present application does not include more than one patentably and non-obviously distinct invention, and Applicant maintains that this application may include more than one patentably and non-obviously distinct invention. Applicant hereby asserts that the disclosure of this application may include more than one invention, and that these inventions may be patentable and non-obvious one with respect to the other.

Further details, features and advantages of the invention can be found in the following description of a preferred embodiment on the basis of the drawings.

BRIEF DESCRIPTION OF THE DRAWINGS

The present invention is explained in greater detail below with reference to the embodiments which are illustrated in the accompanying drawings.

DESCRIPTION OF THE PREFERRED EMBODIMENT

Figure 1:
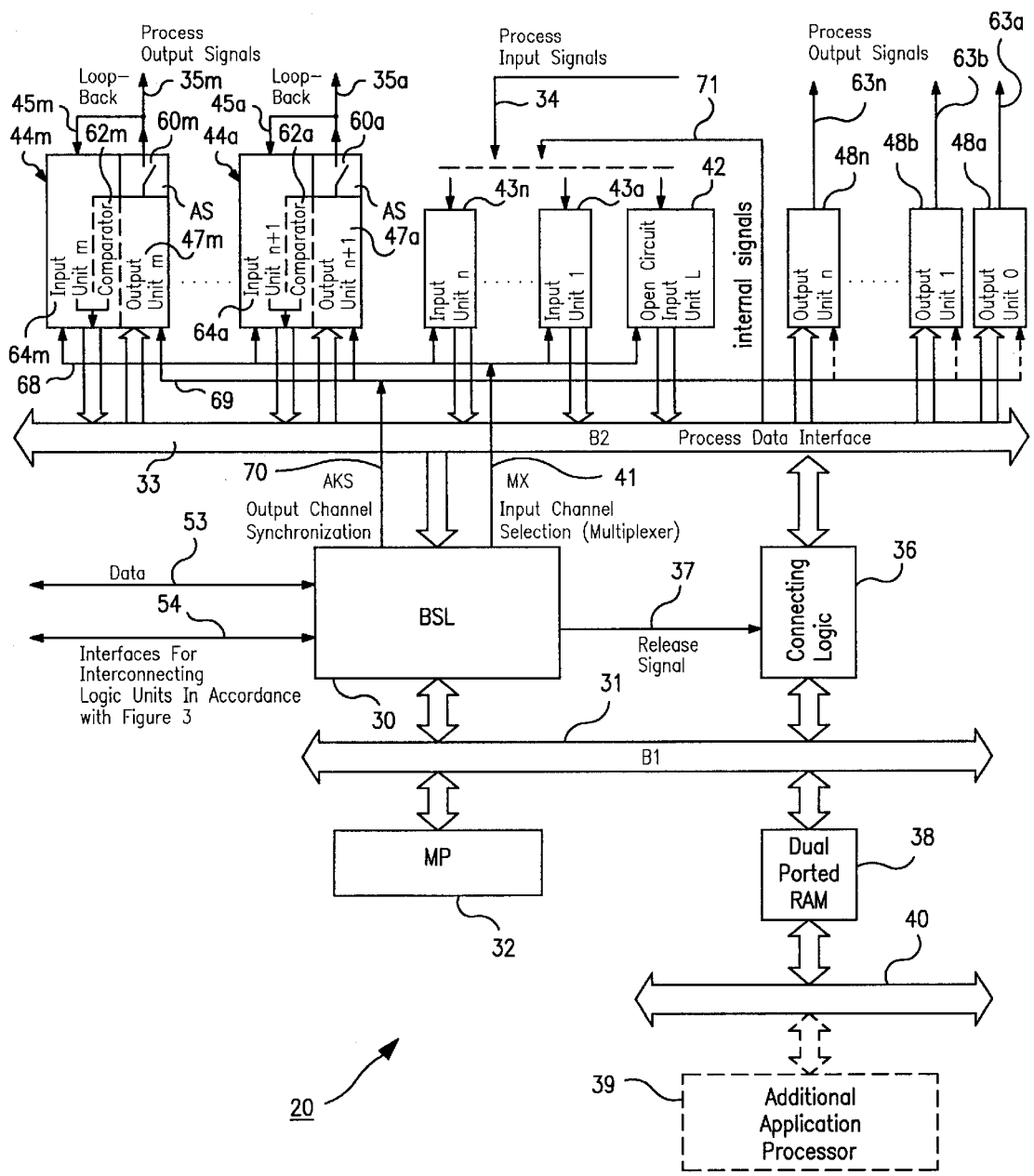
FIG. 1 is an example of a circuit arrangement of a computer unit in accordance with the invention.

FIG. 1 shows the layout in principle of a computer unit RE. A fault tolerant assembly in accordance with the invention is comprised of 3F+1 of these computer units.

A computer unit is comprised essentially of a logic unit BSL, which, via a suitable bus B1, is connected with a microprocessor MP, and which, via another bus B2, serves in the provision of a process data interface, with the process data, particularly the processing input-/output signals. Via a connecting logic between bus B1 and bus B2, the microprocessor MP also access to the process data, whereby the access to the process data is controlled by the logic units BSL, particularly by means of a release signal, so as to ensure the necessary synchronized procedure of the logic units BSL. The microprocessor MP serves to carry out programs for control of the process data interface (directly and/or via the logic unit BSL), as well as to carry out application-specific programs. Furthermore, the microprocessor MP can be connected via bus B1 and dual-ported RAMs with additional application-specific processors.

To process a plurality of input data in an essentially synchronous manner, each logic unit BSL has a multiplex function MX, which sequentially switches through the input data to the process data interface (bus B2). Also, the multiplex function MX serves for the selection of an open circuit channel L for maintaining the cyclic course, in the event that as to time no process data are at hand, such that the logic unit BSL operates independently of events and essentially absolutely deterministically. The pertaining open circuit channel L can also serve to synchronize various computer applications with one another, if this is required. An essentially particularly advantageous embodiment of the present invention may be the selection of the pertaining input unit which is realized therein that in each cycle of data (n) the demand signals at hand of the input channels are also distributed and through a majority decision there is selected the channel which is to be processed in the data cycle (n+1).

In at least one possible embodiment of the present invention, it is preferred that synchronization of the logic units BSL is done via the data transfer between the logic units BSL.

In at least one possible embodiment of the present invention, there may be a bus, data interface, or device or arrangement for transmitting, receiving, sending, calculating, analyzing, or comparing data, which bus, data interface, or device may be represented by reference numeral 40. In FIG. 1, the bus, data interface, or device or arrangement 40 is shown to be associated with, corresponding to, linking, or connecting the dual-ported RAM 38 and the additional application processor 39.

Finally, it is also possible to return, with the aid of combined input-/output units, those data which were for output transferred to these, however, only were sent from the combined input-/output unit as process output signal to the exterior, during which the output switch AS was closed, via loop-back lines to all like input units (n+1, n+2, etc.), and with the aid of a comparator to compare those data with data transferred to the output. The pertaining result of comparison is distributed and verified as component of the input data or return-read output data in accordance with the Byzantine algorithm. In this manner it is possible to examine the output path of the computer units RE inclusive of the combined input-/output units in accordance with the Byzantine algorithm for fault-free functioning. For this purpose, the output units of the combined input-/output units are synchronized by the logic unit BSL via a corresponding signal. Furthermore, the output units 0 to n can be synchronized in the same manner.

In this representation a further essentially particularly advantageous embodiment of the present invention is shown, which resides therein in that the logic unit BSL is utilizable in flexible manner and application-independent, since it is respectively connected between the process data interface (bus B2) and the application processor. The application, accordingly, obtains its data either directly from the process data interface or, upon verification by means of the Byzantine algorithm, together with status information via the logic unit BSL.

Figure 2:
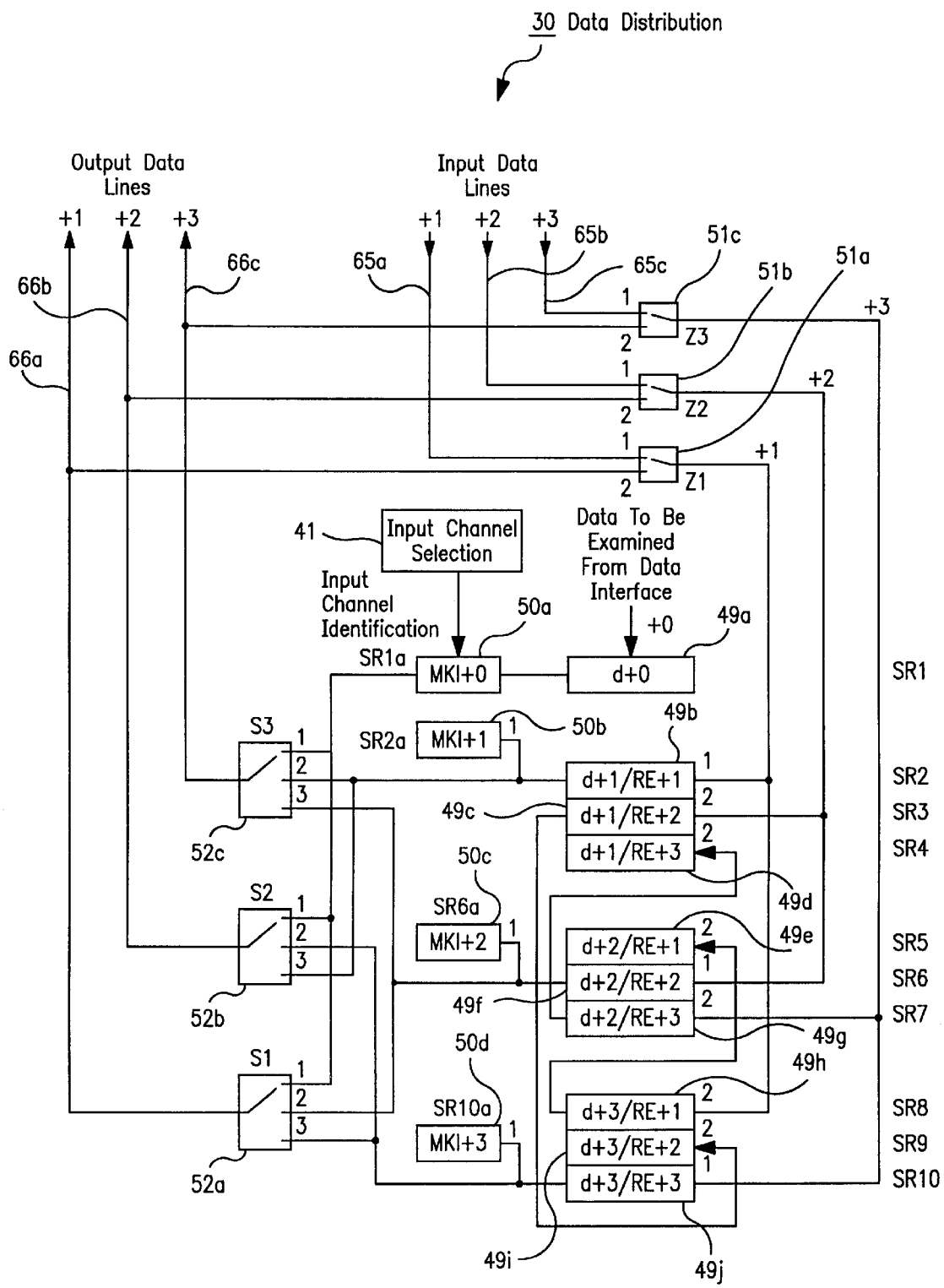
FIG. 2 is a logic unit (BSL) with components for data distribution in accordance with the invention.

FIG. 2 shows the component which serves for data distribution of a logic unit BSL, as well as an associated set of shift registers, comprised of shift registers SR1–SR10, in detail. Furthermore, additional registers SR1$a$, SR2$a$, SR6$a$ and SR10$a$ are provided, which are connected with, respectively, the first, second, sixth, and tenth register SR1, SR2, SR6, SR10, as well as with a multiplex control MX. These additional registers SR1$a$, SR2$a$, SR6$a$ and SR10$a$ contain the respectively selected multiplex channel identification MKI+i and serve, together with the multiplex control MX for pre-selection of the respectively next input channel, which pre-selection is coordinated between the logic units BSL, which then in the next data cycle over each multiplexer MX is connected in the manner of a through-line to the pertaining logic unit BSL.

The shift registers SR1+SR1$a$, SR2, SR6 and SR10 are re-coupled during the out-reading course (not shown), such that on completion of the out-reading course again the original data in the respective registers are present.

Furthermore, there are provided additional switches Z1 to Z3 which are respectively connected into the input data lines +1, +2, +3 of the set of registers. These additional switches may serve to generate a complete data set or data sentence in the event that one logic unit is deactivated. In this case the additional switch in the input data line leading to the deactivated logic, in contrast to the shown position 1, is transferred to position 2, such that the read-out data are passed from the registers and over to the switch S1, S2 or S3 associated with the deactivated logic unit, and passed data are in-read again, to store valid data again in the pertaining shift registers SRi.

Figure 3:
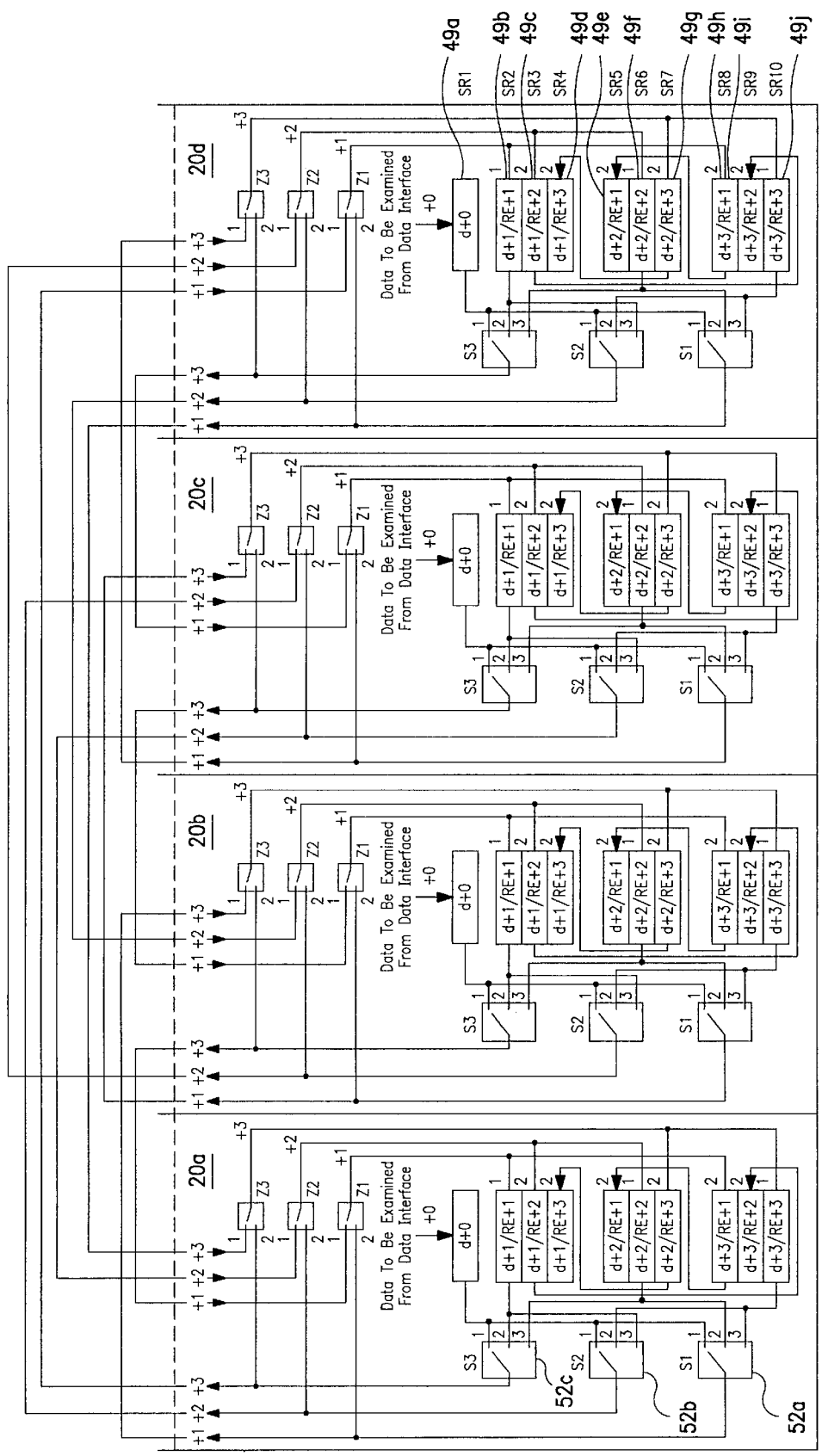
FIG. 3 is an assembly in accordance with the invention of 3F+1 logic units in accordance with the invention, whereby F=1.

The condition in consideration to the positions of the switches S1 to S3, as well as the inputs identified by numerals 1 and 2 of the shift registers, are explained or shown in FIG. 3.

FIG. 3 shows the connection of the components serving for data distribution of the logic unit BSL (compare FIG. 2) of four computer units RE1, RE2, RE3, RE4 in an assembly in accordance with at least one possible embodiment of the present invention. The additional registers SRia shown in FIG. 2 are not included in FIG. 3 since they may not be necessary for the description of the data distribution between the computer units (RE1 to RE4).

The data distribution cycles are realized, in accordance with at least one possible embodiment of the present invention, by the circuitry shown in FIG. 3 of the individual registers, in conjunction with an operational control and a relative identification of the shown logic units BSL of the four computer units RE1 to RE4, or Modulo 4 check.

The exchange of data between the logic units of the computer units (RE1 to RE4) may be carried out in two data distribution cycles. The numerals 1 and 2 at the inputs of the shift registers SR1 to SR10 indicate in which of the two distribution cycles, over the pertaining input, data are read in. The first to third switches S1, S2 and S3 in each logic unit BSL have respectively three switch positions 1, 2, and 3. The shown switch position 1 is being assumed during the first distribution cycle, the switch position 2 during the second distribution cycle for respectively a first data set or data sentence or word, and the switch position 3 during the second distribution cycle for respectively a second data set or data sentence. The processing course is in detail as follows:

The computer units RE1 to RE4 or, respectively, their shown logic units, are associated with one another in a cyclically increasing manner of checking or counting, or Modulo 4 check, whereby a computer unit which is immediately to the right of another computer unit and which has, in contrast, the relative address +1, and the computer unit arranged thereto to the right, which has the relative address +2, and so forth.

The data which are to be processed by the assembly and, in respect of being fault-free, are to be examined, are initially passed to each logic unit via their pertaining process data interface, namely, the bus B2, and are read into the respective first shift register SR1 of the respective register set.

With a first data distribution cycle, all data d+0 then are transferred from the first registers SR1 via the respective switch S1, in switch position 1, into the tenth register SR10 of the neighboring register set with relative address +1.

Simultaneously, into the respectively first registers SR1 of the four units data in-read are transferred, via each second switch S2, in switch position 1, into the sixth register SR6 of the next but one register set, with relative address +2, and via each third switch S3, in switch position 1, into the second register SR2 of the to the left adjacent register set, with the relative address +3. At the conclusion of this first data distribution cycle, thus, each register set contains in the respective first register SR1 the data passed to it initially, as well as, furthermore, in the registers SR2, SR6 and SR10, the original data from the three other register sets, which were passed respectively via this logic unit.

The corresponding data carry the designation d+i/RE+j. The numeral i hereby designates the origin of the data d, that is, in relative identification, the computer unit into which the data were originally in-read, while the numeral j designates that computer unit RE from which these data were transferred. The data of all second registers SR2 stem from, accordingly, in ascending counting manner, respectively neighbor, and are positioned to the right of the register set with the relative identification +1, and are also passed via this.

The additional registers SR2a+i (not shown in FIG. 3) are to be considered in the first distributing cycle as extensions of the registers SR2+i; their contents are distributed as described above together with the contents of the registers SR2+i. These additional registers are inactive in the second distribution cycle.

On conclusion of the first distribution cycle, a first part of the second data distribution cycle commences, upon moving the first to third switches S1 to S3 into the position 2.

The data from the sixth registers SR6 are now transferred via the first switches S1 into the register set with the relative address +1, and are firstly transferred from there into the seventh register SR7 from where they then, during the second part of the second distribution cycle, are moved, respectively, into the fifth register SR4. Furthermore, the contents of the tenth register SR10 are loaded, via the second switches S2, into the register set with relative address of +2, and there are initially loaded into the respective third register SR3, from where they then, during the second part of the second distribution cycle, respectively are moved into the ninth register SR9. Finally, the second registers SR2, via the third switches S3, are loaded into the register set with the relative address +3 and there initially are loaded into the respectively eighth register SR8, from where they then, during the second part of the second distribution cycle, respectively, are moved into the fifth register SR5.

This is the conclusion of the first part of the second data distribution cycle. The switches S1 to S3 are now brought to the position 3, such that the second part of the second data distribution cycle can commence.

Via the first switches S1, thereby, the contents of the tenth registers SR10 of each register set are transferred into the register set with the relative address +1, and are there stored in the seventh register SR7. Via the second switches S2, the contents of the second registers SR2 of each register set are transferred into that one, or the corresponding register, with the relative address +2, and there are stored in the third register SR3. Finally, via the third switches SR3, the contents of the sixth registers SR6 of each register set are transferred into those with the relative address +3, and are there transferred into the eighth register SR8.

In each transfer of a datum or singular unit of data, the datum's designation changes in consideration of its origin d, as well as the computer unit RE from which it was transferred, due to the corresponding relative identification of the computer units. From this, on conclusion of the second data distribution cycle, results the register occupancy shown in FIGS. 2 and 3, which is the same in all computer units RE1 to RE4.

Figure 5:
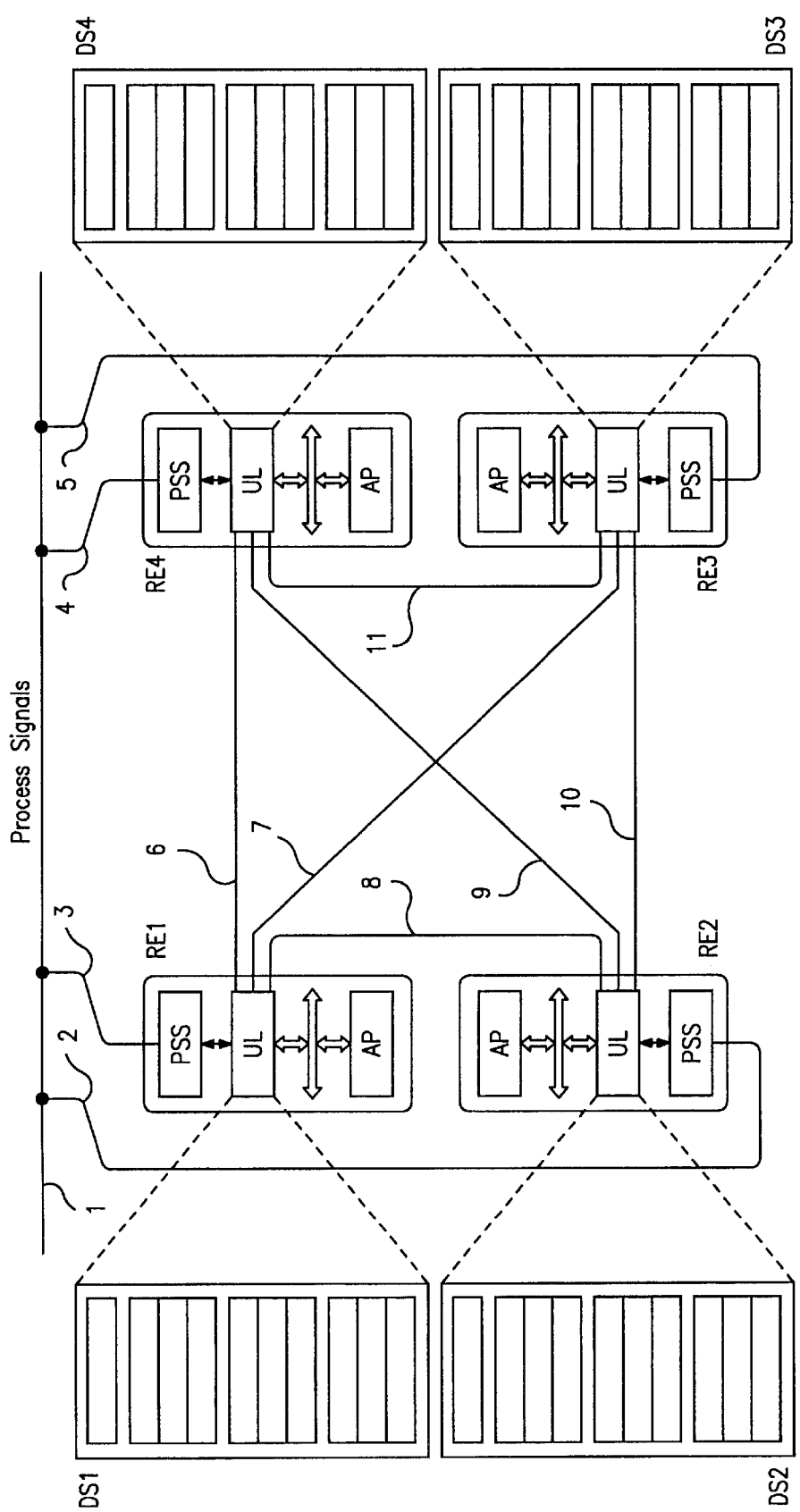
FIGS. 5 and 5a, 5b, and 5c show the circuitry and procedure of in-reading and distribution of data in a known fault tolerant assembly of computer units.
Figure 6:
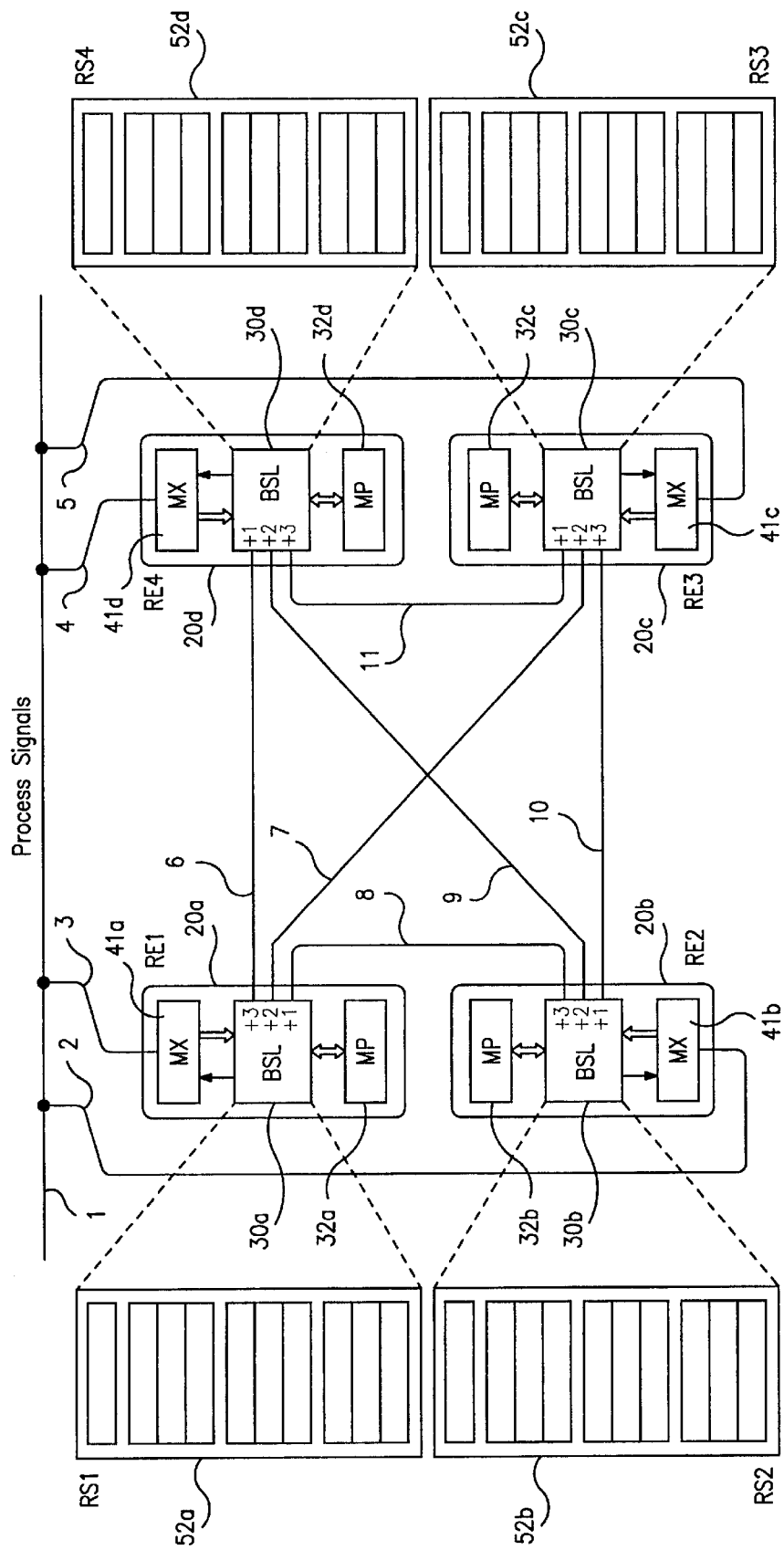
FIGS. 6 and 6a, 6b, and 6c show the circuitry as well as the course of in-reading and distributing of data in accordance with a fault tolerant assembly in accordance with the invention.

FIG. 6 shows an assembly of four computer units RE1, RE2, RE3, RE4, each having a logic unit BSL. These computer units are connected, as are those shown in FIG. 5, with process signal lines 1 to 5 for input and output of process data. The data lines 6 to 11 form, as in FIG. 5, bi-directional connections between the computer units RE1 to RE4 for the transmission of data and deactivating signals. Lines 1 to 11 shown in FIG. 6 can be found again in corresponding manner in FIGS. 6a, 6b, and 6c, with the identifications by reference numerals being described hereinbelow.

Each computer unit RE1 to RE4 has a logic unit BSL which is connected to inputs identified by the relative identification +1, +2, +3 and to outputs, via data lines 6 to 11. In the computer units shown in FIG. 6, the logic units BSL are respectively connected to a microprocessor MP, as was explained above with reference to FIG. 1. Furthermore, the multiplex function realized in the logic units BSL is shown schematically by block MX. Each logic unit BSL has a register set RS1, RS2, RS3, or RS4 and, in accordance with FIG. 2, includes the registers SR1 to SR10.

Figure 5C:
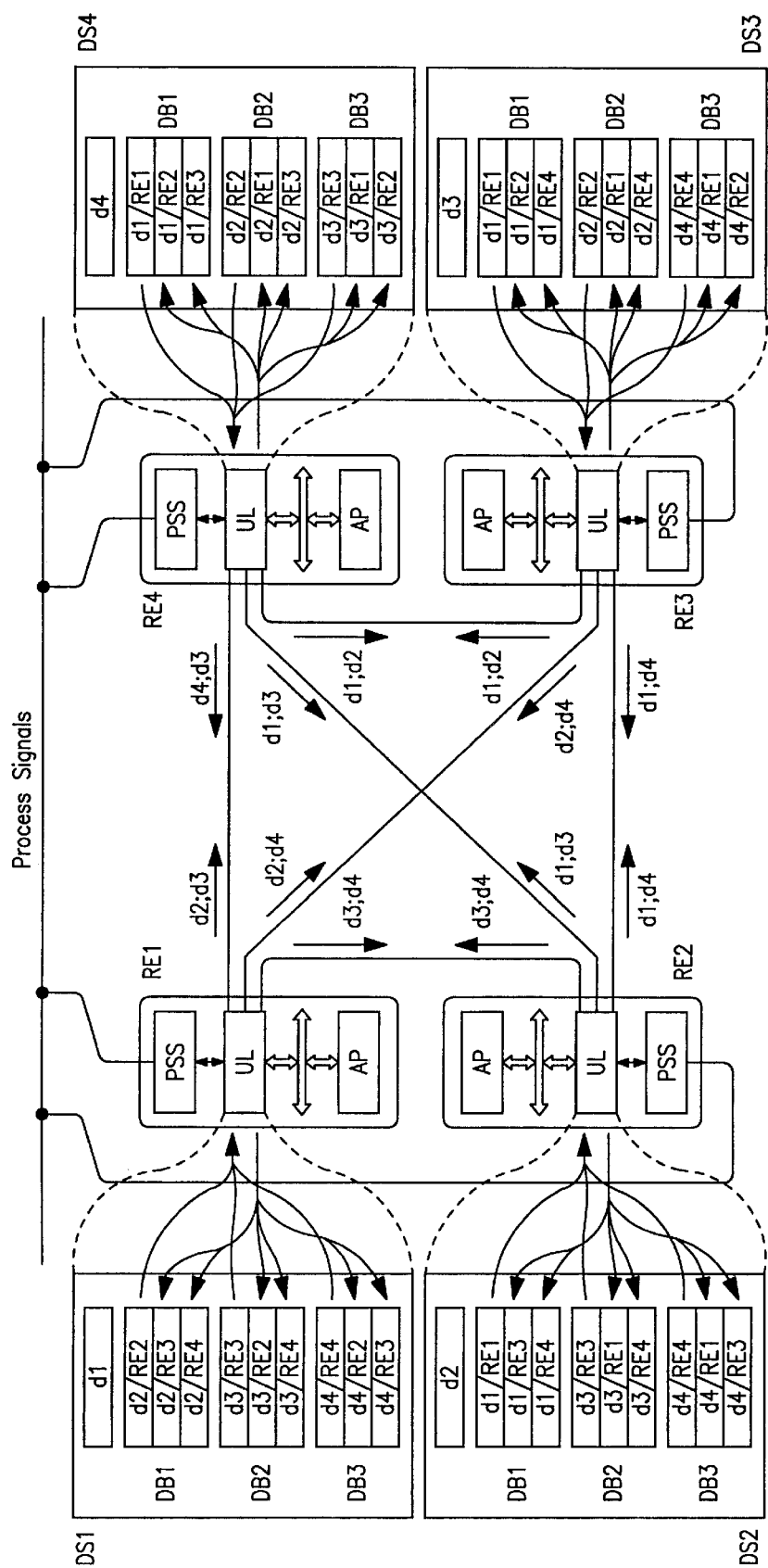
Figure 6A:
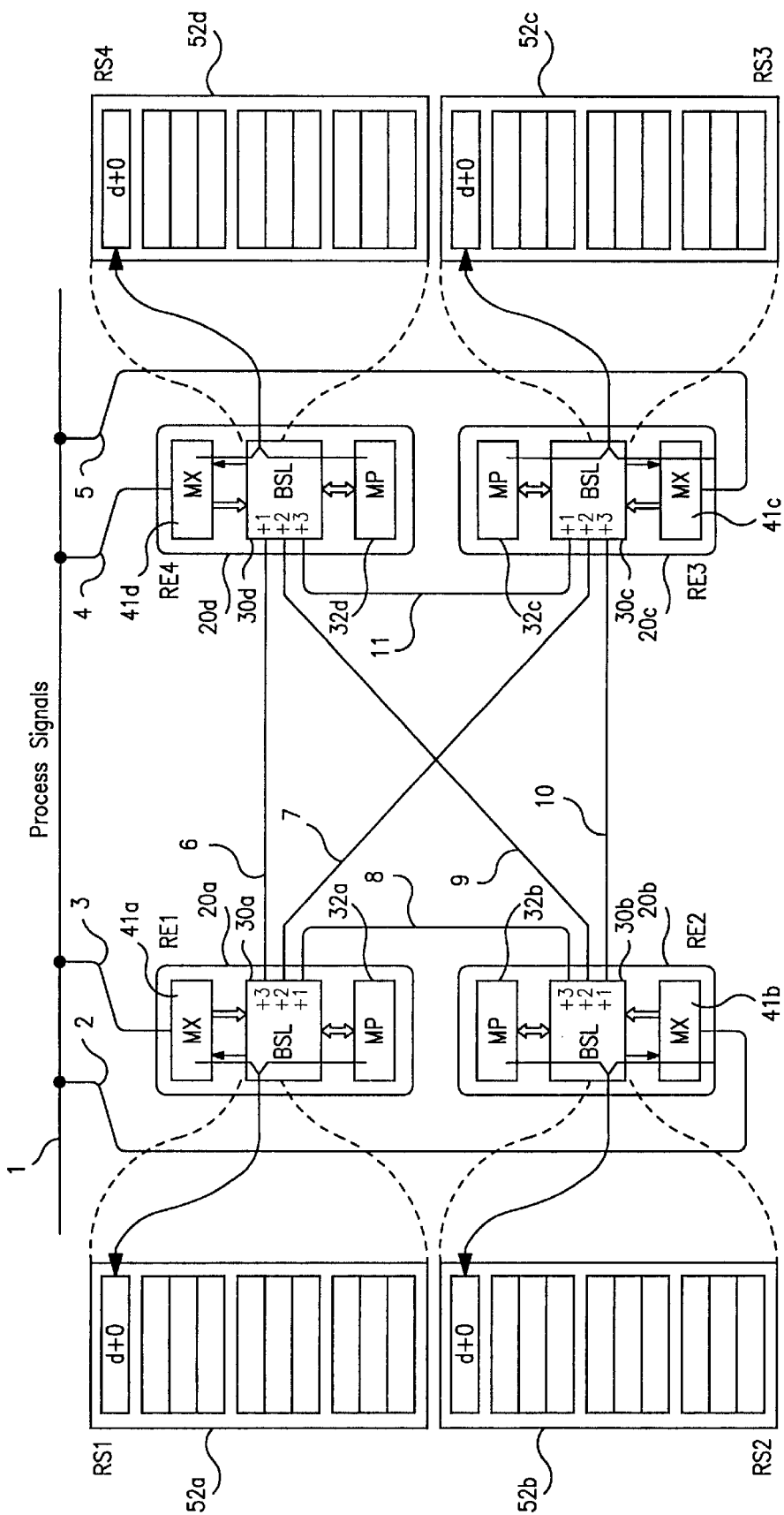
Figure 6B:
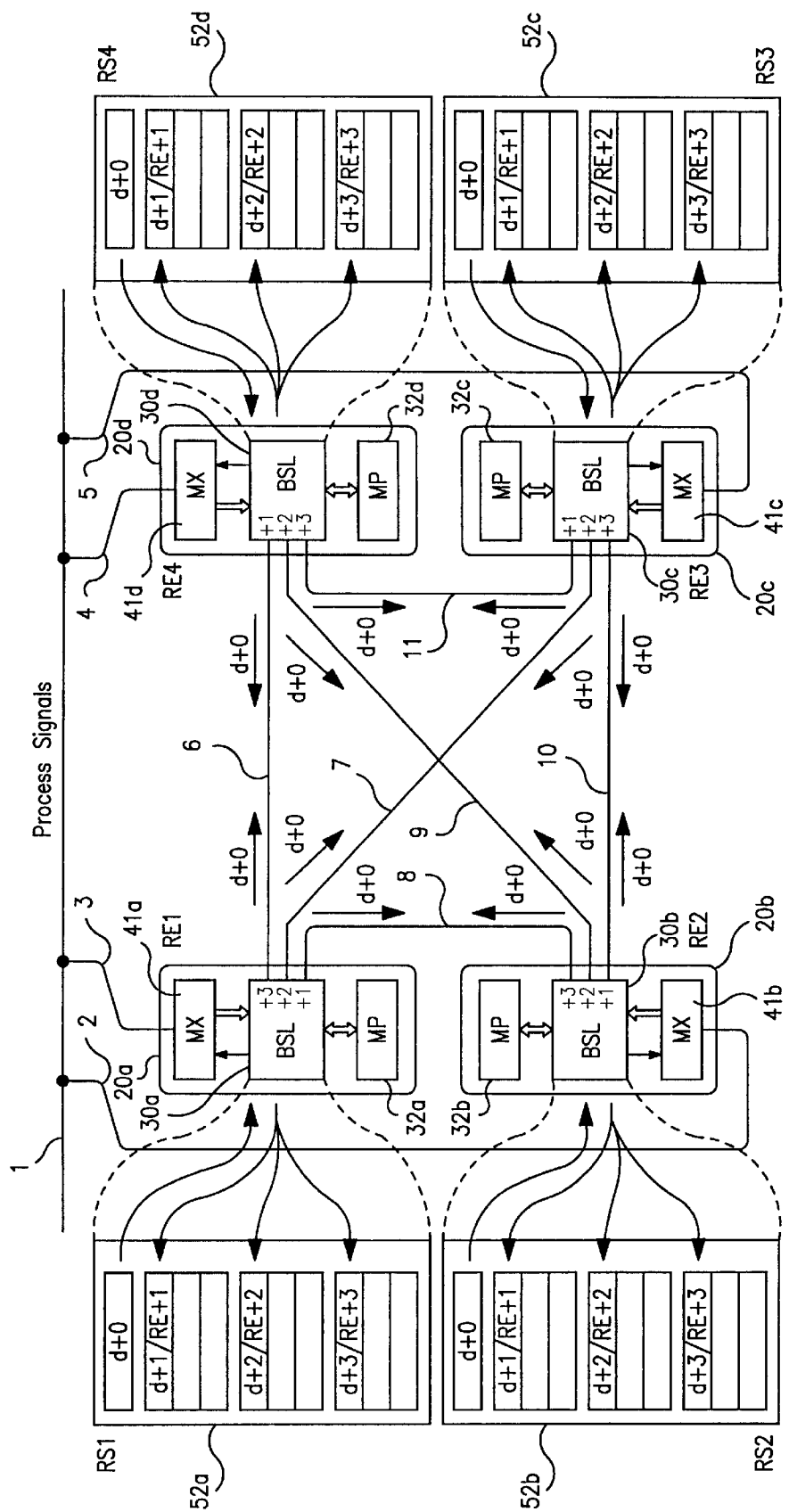
Figure 6C:
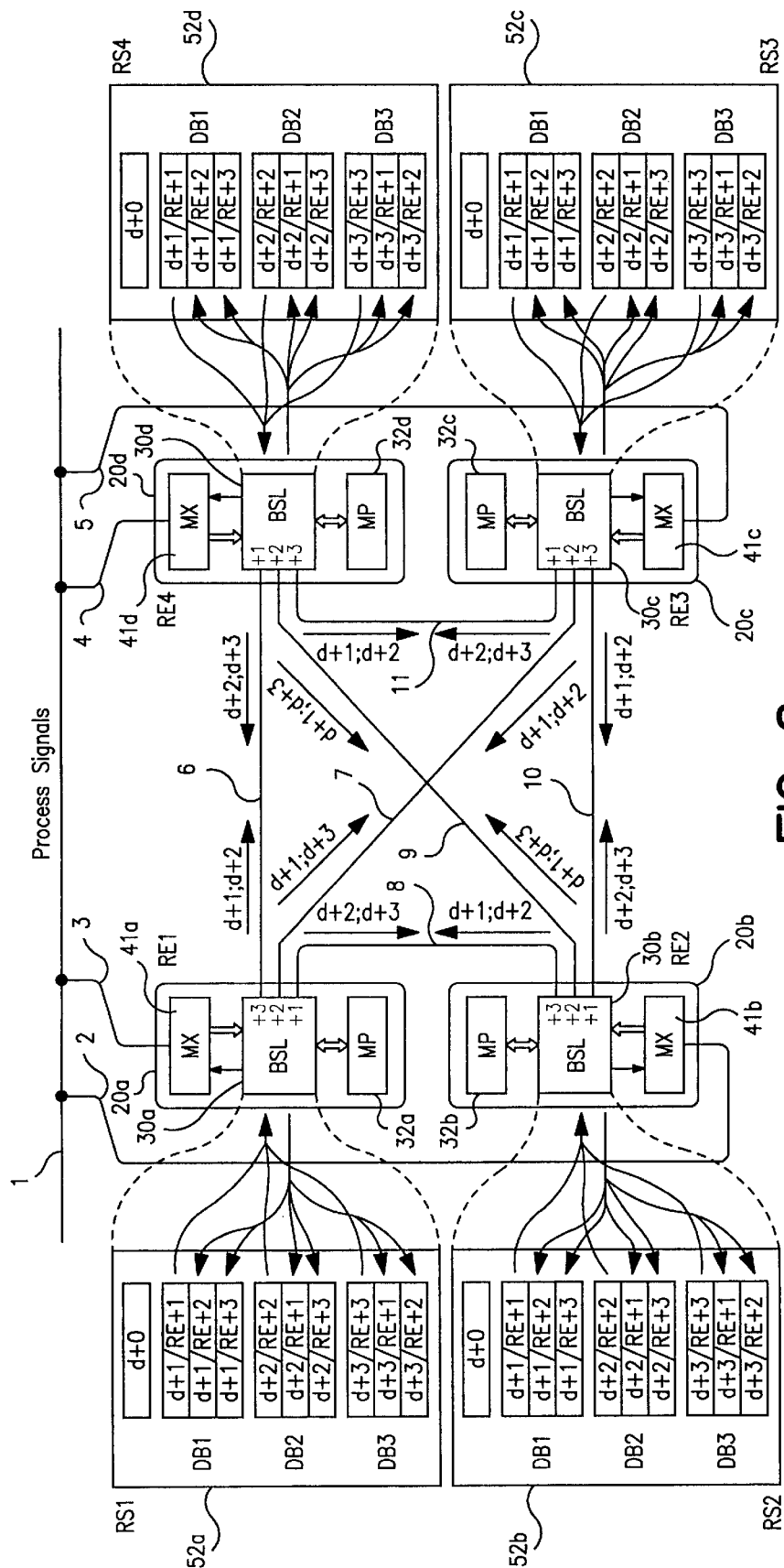

The individual steps of the data distribution, in accordance with at least one possible embodiment of the present invention and as just described, are shown in FIGS. 6a to 6c. When comparing the representation in FIG. 6c and the representation of known computers according to FIG. 5c, it may be essentially clear that the contents of all four register sets RS1 to RS4, on conclusion of the data distribution cycle, are the same (FIG. 6c), whereby, however, the data storages DS1 to DS4 (FIG. 5c) have differing contents, every time fault-free data being a precondition. Thus, this is done without an individual data evaluation in the computer or, respectively, the logic unit in accordance with at least one possible embodiment of the present invention, which is a requirement in known computer units. This may provides the possible advantage that in contrast to the architecture of a known fault tolerant assembly, the assembly in accordance with at least one possible embodiment of the present invention can be realized using essentially identical computer units or, respectively, logic units, essentially independently of their physical position of use in the computer assembly.

The circuitry shown in FIG. 3 of the computer units is to be provided, along the just-described data lines, also for deactivating lines (not shown). In FIG. 1 these lines are shown as input and output lines of the logic unit BSL.

Figure 4:
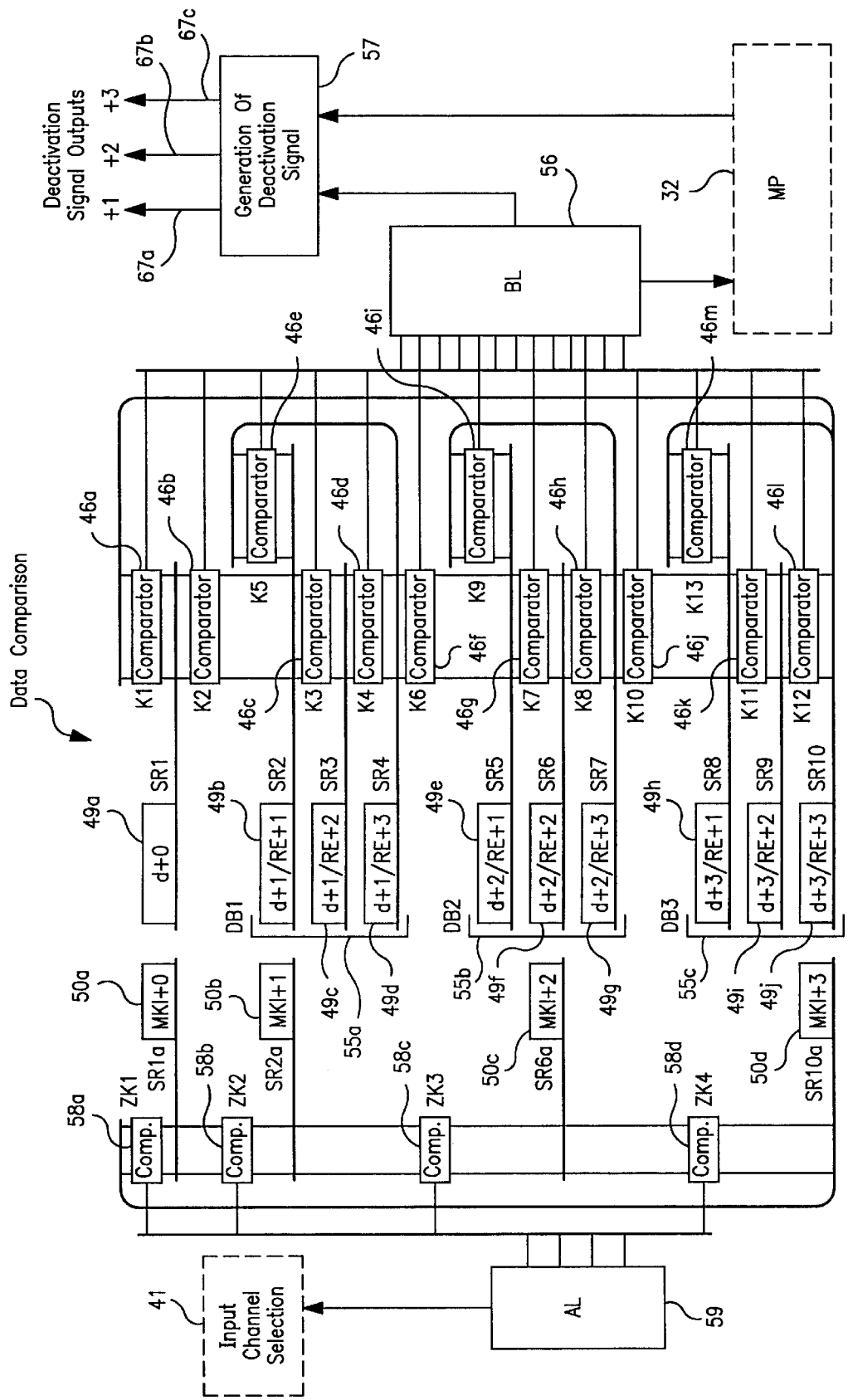
FIG. 4 is a logic unit in accordance with the invention with components for data comparison and a microprocessor.

FIG. 4 shows a principle of the comparison and the evaluation of the in-read data as well as data blocks DB1 to DB3. For the determination of identities, a plurality of comparators K1, K2, K3, K4, K5, K6, K7, K8, K9, K10, K11, K12, K13 is provided. These are arranged in such a manner that for a data block DBi there is created an inner comparator ring, comprised of 3 comparators K3, K4, K5 or, respectively, K7, K8, K9 or, respectively, K11, K12, K13, as well as an outer comparator ring, comprised of the four comparators K1, K2, K6 and K10, which outer comparator ring combines the 3 inner comparator rings and the register SR1 with one another.

The contents of the first and tenth registers SR1, SR10 are compared with a first comparator K1. The contents of the first and second registers SR1, SR2 with a second comparator K2. The contents of the second and third registers SR2, SR3 are compared with a third comparator K3. The contents of the third and fourth registers SR3, SR4 are compared with a fourth comparator K4, as well as with a fifth comparator K5. The contents of the second and fourth registers SR2, SR4 are compared with a fifth comparator K5.

In corresponding manner, a sixth comparator K6 serves to compare the contents of the fourth register SR4 with the fifth register SR5. A seventh comparator K7 compares the contents of the fifth and sixth registers SR5, SR6. An eighth comparator K8 compares the contents of the sixth and seventh registers SR6, SR7. A ninth comparator K9 compares the contents of the fifth and seventh registers SR5, SR7.

Finally, a tenth comparator K10 serves to compare the contents of the seventh register SR7 with the eighth register SR8. An eleventh comparator K11 compares the contents of the eighths and ninth registers SR8, SR9. A twelfth comparator K12 compares the contents of the ninth and tenth registers SR9, SR10. A thirteenth comparator K13 compares the contents of the eighth and tenths registers SR8, SR10.

The outputs of the comparators K1 to K13 are connected with an evaluation logic BL which can initiate, in the event of a fault, on the one hand, deactivating signals and which, on the other hand, sends the identification of the registers with fault-free data to the microprocessor MP. For out-reading of the register contents all registers are connected to the data bus (not shown) of the microprocessor MP.

In at least one possible embodiment of the present invention, the comparison of data may be done in two logical steps, whereby in a first comparison, with the aid of the inner comparator rings K3, K4, X5 or, respectively or receptively, K7, K8, K9 or, respectively, K11, K12, K13, the data d+i within a block of data DBi, which with respect to origin arise from the same logic unit or, respectively, computer unit RE+i, but which were transmitted via different paths, are examined for bitwise identity. If no bitwise identity is found in one of these comparisons, a fault is present, and, in accordance with the Byzantine algorithm, there is initiated the generation of a deactivating signal to the fault-carrying logic unit or, respectively, computer unit. When a logic unit or, respectively, computer unit, receives three deactivating signals, it is isolated from the computer assembly. When all data d+i within a pertaining block of data DBi are in bitwise manner identical, in a second comparison, with the aid of the outer comparator ring K1, K2, K6, K10, the contents of the blocks of data, as well as the contents of the register SR1, are compared with one another, whereby between congruent (all register contents are identical in bitwise manner) and quasi-congruent (bitwise identical in the first comparisons, but differing among each other) data can be differentiated. In the case of congruent data, no fault is present and no deactivation signal is generated. In the case of quasi-congruent data, the evaluation of such data is subject to the application which, as required, can also generate, as required, initiation of a deactivating signal.

In the left hand portion of FIG. 4 are shown again additional registers SR1a, SR2a, SR6a and SR10a, the contents of which are also compared with one another by way of comparators ZK1 to ZK4. The outputs of the comparators are connected to a selection logic AL, with which is done a pre-selection of the multiplex channel which needs to be switched, in the manner of a through-line, as in the next following description.

Since, in the fault tolerant assembly in accordance with at least one possible embodiment of the present invention, in contrast with the known computer assembly, the data distribution and data comparison for bitwise identity are exclusively realized by hardware, as well as on the lowest level of logic—namely, are carried out in individual process data units—the assembly of at least one possible embodiment of the present invention is essentially faster and more reliable. The throughput of data is essentially better, the reaction times are essentially shorter, and the logic units or, respectively, computer units, are operating with essentially absolute synchronization and deterministically or in a deterministic manner.

In other words, FIG. 1 shows the layout in principle of a computer unit RE, identified by reference numeral 20.

With reference to FIG. 3, a fault tolerant assembly in accordance with the invention is comprised of 3F+1 of these computer units, for example, for f=1, four units 20a, 20b, 20c, and 20d.

A computer unit 20 (FIG. 1) is comprised essentially of a logic unit BSL, reference numeral 30, which via a suitable bus B1, reference numeral 31, is connected with a microprocessor MP, reference numeral 32, and via another bus B2, reference numeral 33, which serves as process data interface for the process data, particularly the processing or process input signals 34 and at least one of process output signals 63a, 63,b, 63c, and 63n.

Via a connecting logic 36 between bus B1, reference numeral 31, and B2, reference numeral 33, the microprocessor MP, reference numeral 32, also has access to all of the process data, whereby the access to the process data is controlled by the logic units BSL, reference numeral 30a to 30d, by means of a release signal 37, so as to ensure the necessary synchronized procedure of the logic units 30a to 30d. Deactivating signals are moved by line 54 and data flow is also indicated by line 53.

The microprocessor MP, reference numeral 32, may serve to carry out programs for control of the process data interface 31 (directly and/or via the logic unit BSL, 30), as well as to carry out application-specific programs.

Furthermore, the microprocessor 32 can be connected via bus B1, reference numeral 31, and dual-ported RAMs, one being shown in FIG. 1, reference numeral 38, with additional application specific processors, such as 39.

To process a plurality of input data 34 in synchronous manner, each logic unit BSL 30a to 30d has a multiplex function MX, reference numeral 41, which switches through, sequentially, the input data 34 to the process data interface (bus B2), reference numeral 33.

Also, the multiplex function 41 serves for the selection of an open circuit channel L, reference numeral 42, for maintaining the cyclic course or path, in the event that as to time no process data are at hand, such that the logic unit BSL, 30, operates essentially independently of events and essentially absolutely deterministically.

The pertaining open circuit channel 42 can also serve to synchronize various computer applications with one another, if this is required.

A particularly advantageous embodiment of the invention is the selection of the pertaining input unit 43*a* to 43*n*, which is realized therein that in each cycle of data (n) the demand signals at hand of at least one of the input channels 43, which may be represented by reference numerals 43*a* and 43*n*, 43*a*, and 43*n*, are also distributed and through a majority decision there is selected the channel which is to be processed in the data cycle (n+1).

It is preferred that synchronization of the logic units 30*a* to 30*d* is done via the data transfer between the logic units 30*a* to 30*d*.

Finally, it is also possible to return, with the aid of combined input/output units 44*a* to 44*n*, those data which were for output transferred to these, however, only were sent from the pertaining combined input/output unit 44, which may be represented by at least one of reference numerals 44*a* and 44*m*, as process output signal 35, which may be represented by at least one of reference numerals 35*a* and 35*m*, to the exterior, during which the output switch AS, reference numeral 60, which may be represented by at least one of reference numerals 60*a* or 60*m*, was closed, via loop-back lines 45*a* to 45*n*, or 45*a* to 45*m*, to all like input units (n+1, n+2, etc.), reference numerals 43*a* to 43*n*, and with the aid of comparators 62*a* to 62*m* to compare those data with data transferred to the output sides 47*a* to 47*m* of the combined input/output units 44*a* to 44*m*.

The pertaining result of comparison is distributed and verified as component of the input data (return-read output data) in accordance with the Byzantine algorithm.

In this manner it is possible to examine the output path of the at least one of the computer units 20 and RE 20*a* to 20*d* (shown in FIG. 3) inclusive of the combined input/output units 44*a* to 44*m*, in accordance with the Byzantine algorithm for fault-free functioning.

For this purpose, the output units or sides 47*a* to 47*m* of the combined input/output units 44*a* to 44*m* are synchronized by the logic unit BSL 30 via a corresponding signal. Furthermore, the output units 0 to n, at least one of reference numerals 48, 48*a*, 48*b*, and 48*n*, can be synchronized in the same manner.

In this representation a further essentially particularly advantageous embodiment of the invention may be shown or made clear, which resides therein in that the logic unit BSL 30 is utilizable in a flexible manner and is application-independent, since it is respectively connected between the process data interface (bus B2, reference numeral 33) and the application processor 39. The application processor 39, accordingly, obtains its data either directly from the process data interface 33 or, upon verification by means of the Byzantine algorithm, together with status information via the logic unit BSL 30.

The multiplex function 41, as is shown in FIG. 1, is connected to the input units 43*a* to 43*n*, the open circuit channel 42, and the input sides or portions 64*a* to 64*m* of the combined input/output units 44*a* to 44*m* by line 68. Similarly the exit channel synchronization 70 of the logic unit 30 is connected by line 69 to the output portions or sides 47*a* to 47*m* of the input/output units 44*a* to 44*m* and, selectively, to the output units 48*a* to 48*n*, or to the output units, which may be represented by at least one of reference numerals 48*a*, 48*b*, and 48*n*.

Internal signal distribution is indicated by reference numeral 71.

FIG. 2 shows the component which serves for data distribution of a logic unit BSL 30, as well as an associated set of shift registers, comprised of shift registers SR1–SR10, reference numerals 49*a* to 49*j*—that is, reference numerals 49*a*, 49*b*, 49*c*, 49*d*, 49*e*, 49*f*, 49*g*, 49*h*, 49*i*, and 49*j*—in detail.

Furthermore, additional registers SR1*a*, SR2*a*, SR6*a* and SR10*a*, reference numerals 50*a*, 50*b*, 50*c*, and 50*d*, are provided which are connected with the first, 49*a*, second, 49*b*, sixth, 49*f*, and, respectively, tenth register, 49*j* (SR1, SR2, SR6, SR10), as well as with a multiplex control 41. These additional registers 50*a* to 50*d* contain the respectively selected multiplex channel identification MKI+i and serve, together with the multiplex control 41, for preselection of the respectively next input channel, which is coordinated between the logic units BSL 30*a*, 30*b*, 30*c*, and 30*d*, and which then in the next data cycle over each multiplexer 41 is connected in the manner of a through-line to the pertaining logic unit BSL 30.

The shift registers SR1+SR1*a*, SR2, SR6 and SR10, 49*a*+50*a*, 49*b*, 49*f*, 49*j* are re-coupled during the out-reading course (not shown), such that on completion of the out-reading course again the original data in the respective registers are present.

Furthermore, there are provided additional switches Z1, Z2, and Z3, reference numerals 51*a*, 51*b*, and 51*c*, which are respectively connected into the input data lines 65*a*, 65*b*, 65*c* (+1, +2, +3) of the set of registers 49*a* to 49*j*. These additional switches 51*a* to 51*c* serve to generate a complete data set, or data sentence or word, in the event that one logic unit 30 is deactivated. In this case the additional switch 51, which may be represented by at least one of reference numerals 51*a*, 51*b*, and 51*c*, in the input data line 65, which may be represented by at least one of reference numerals 65*a*, 65*b*, and 65*c*, leading to the deactivated logic unit 30, in contrast to the shown position 1, is transferred to position 2, such that the read-out data is passed from the registers 49*a* and over to the switch 52*a*, 52*b*, or 52*c* (S1, S2 or S3) associated with the deactivated logic unit 30, and passed data are in-read again, so as to store valid data again in the pertaining shift registers SRi. The switches 52*a* to 52*c* are connected to output data lines 66*a*, 66*b*, and 66*c* which, in turn, are connected to the additional switches 51*a* to 51*c* in corresponding manner.

The condition in consideration to the positions of the switches S1 to S3, 52*a* to 52*c*, as well as the inputs identified by numerals 1 and 2 of the shift registers 49*a* to 49*j*, are explained with FIG. 3.

FIG. 3 shows a connection of the components serving for data distribution of the logic unit 30, BSL (compare FIG. 2, in which the logic unit 30 is shown), of four computer units 20*a*, 20*b*, 20*c*, and 20*d* (RE1, RE2, RE3, RE4) in an assembly in accordance with the invention. The additional registers SRi*a* (50*a*, 50*b*, 50*c*, and 50*d*), shown in FIG. 2, are not included in FIG. 3 since they are not necessary for the description of the data distribution between the computer units 20*a* to 20*d* (RE1 to RE4).

The data distribution cycles are realized in accordance with the invention by the circuitry shown in FIG. 3 of the individual registers 49a to 49j, in conjunction with an operational control and a relative identification of the shown logic units of the four computer units 20a to 20d (RE1 to RE4) by a checksum or modulo 4 check.

The exchange of data between the logic units of the computer units 20a to 20d (RE1 to RE4) is carried out in two data distribution cycles. The numerals 1 and 2 at the inputs of the shift registers 49a to 49j (SR1 to SR10) indicate in which of the two distribution cycles, over the pertaining input, data are read-in. The first to third switches 52a to 52c (S1, S2 and S3) in each logic unit 30a to 30d have respectively three switch positions. The shown switch position 1 is assumed during the first distribution cycle; the switch position 2 is assumed during the second distribution cycle for respectively a first data set, data sentence or data word; and the switch position 3 is assumed during the second distribution cycle for respectively a second data set, data sentence or data word. The processing course is in detail as follows:

The computer units 20a to 20d (RE1 to RE4) or, respectively, their shown logic units (30a to 30d), are associated with one another in a cyclically increasing manner of checking or counting, checksum or modulo-4 check, whereby a computer unit 20, which may be represented by at least one of reference numerals 20a, 20b, 20c, and 20d, which is essentially immediately to the right of another computer unit 20, which may be represented by at least one of reference numerals 20a, 20b, 20c, and 20d, has, in contrast, the relative address +1, and the computer unit 20, which may be represented by at least one of reference numerals 20a, 20b, 20c, and 20d, arranged to the right thereof has the relative address +2, and so forth. Thus, computer unit 20b has the relative address +1 and computer unit 20c has the relative address +2.

The data which are to be processed by the assembly and examined in respect of being fault-free are initially passed to each logic unit 30a to 30d via their pertaining or corresponding process data interface, namely, the bus 33 (B2) (shown in FIG. 1), and are read into the respectively first shift register 49a (SR1) of the respective register set 49a to 49j.

With a first data distribution cycle, then, all data d+0 are transferred from the first registers 49a (SR1) via the respective switch 52a (S1), in switch position 1, into the tenth register 49j (SR10) of the neighboring register set with relative address +1.

Simultaneously, into the respectively first registers 49a of the four computer units 20a to 20d, data in-read are transferred, via each second switch S2, reference numeral 52b, in switch position 1, into the sixth register 49f (SR6) of the next but one register set, with relative address +2, and via each third switch 52c (S3), in switch position 1, into the second register 49b (SR2) of the adjacent register set to the left, with the relative address +3. At the conclusion of this first data distribution cycle, thus, each register set contains in the respectively first register 49a (SR1) the data passed initially to it, as well as, furthermore, in the registers 49b, 49f, 49j (SR2, SR6 and SR10), the original data from the three other register sets, which were passed respectively via the pertaining logic unit 30.

The corresponding data carry the designation d+i/RE+j. The numeral i designates the origin of the data d, that is, in relative identification, that computer unit 20 (shown in FIG. 1) into which the data were originally in-read, while the numeral j designates that computer unit 20 (RE) (shown in FIG. 1), which computer unit 20 may be represented by at least one of reference numerals 20a, 20b, 20c, and 20d, from which these data were transferred. The data of all second registers 49b (SR2) stem from, accordingly, the respectively neighboring register set 49a to 49j with the relative identification +1, which register set is positioned to the right of the second registers 49b (SR2), in ascending manner, and were also passed via this.

The additional register SR2a+i (not shown in FIG. 3) are to be considered in the first distributing cycle as extensions of the registers SR2+i, reference numeral 50b (shown in FIG. 2); their contents are distributed as described above, together with the contents of the registers SR2+i. These additional registers are inactive in the second distribution cycle.

On conclusion of the first distribution cycle, a first part of the second data distribution cycle commences upon moving the first to third switches 52a to 52c (S1 to S3) into the position 2.

The data from the sixth registers 49f (SR6) are now transferred via the first switches 52a (S1) into the register set with the relative address +1, and are firstly transferred there into the seventh register 49g (SR7), from where they, then, during the second part of the second distribution cycle, are moved, respectively, into the fifth register 49e (SR5). Furthermore, the contents of the tenth register 49j (SR10) are loaded via the second switches 52b (S2) into the register set with relative address of +2, and there are initially loaded into the respective third register 49c (SR3), from where they, then, during the second part of the second distribution cycle, respectively are moved into the ninth register 49i (SR9). Finally, the contents of the second registers 49b (SR2) are loaded via the third switches 52c (S3) into the register set with the relative address +3 and there initially are loaded into the respectively eighth register 49h (SR8), from where they, then, during the second part of the second distribution cycle, respectively, are moved into the fifth register 49e (SR5).

This is the conclusion of the first part of the second data distribution cycle. The switches 52a to 52c (S1 to S3), which are between the registers 49a to 49j and the additional registers 50a to 50d (shown in FIG. 2) and have output lines 66, which output lines 66 may be represented by at least one of reference numerals 66a, 66b, and 66c, are now brought to the position 3, such that the second part of the second data distribution cycle can commence.

Via the first switches 52a (S1), the contents of the tenth registers 49j (SR10) of each register set are thereby transferred into the register set with the relative address +1, and are there stored in the seventh register 49g (SR7). Via the second switches 52b (S2), the contents of the second registers 49b (SR2) of each register set are transferred into the one with the relative address +2, and there are stored in the third register 49c (SR3). Finally, via the third switches 52c (S3), the contents of the sixth registers 49f (SR6) of each register set are transmitted into those with the relative address +3, and are there transferred into the eighth register 49h (SR8).

In each transfer of a datum, or a singular data or a singular piece or unit of data, the datum's designation changes in consideration of its origin d, as well as the computer unit 20 (RE), shown in FIG. 1, from which it was transferred, due to the corresponding relative identification of the computer units 20a to 20d. From this, on conclusion of the second data distribution cycle, there results the register occupancy shown in FIGS. 2 and 3, which is the same in all computer units 20a to 20d (RE1 to RE4).

FIG. 5 of this application shows how, via process signal lines 1, 2, 3, 4, 5, process signals are passed to each computer unit RE1, RE2, RE3, RE4. Further data lines 6, 7, 8, 9, 10, 11 connect each computer unit with respectively one other computer unit. Each of these data lines 6–11 is comprised in detail of bi-directional connections for data and for deactivating signals and providing of clock pulse signals. The lines 1 to 11 shown in FIG. 5 are to be found in corresponding manner in the FIGS. 5a, 5b and 5c, but without reference numerals.

Each one of the four computer units RE1 to RE4 has a process interface PSS and a monitoring logic ÜL, as well as an application specific processor AP. The data storages DS1 to DS4 are part of the monitoring logic ÜL and serve for storing of in-read process data.

Figure 5A:
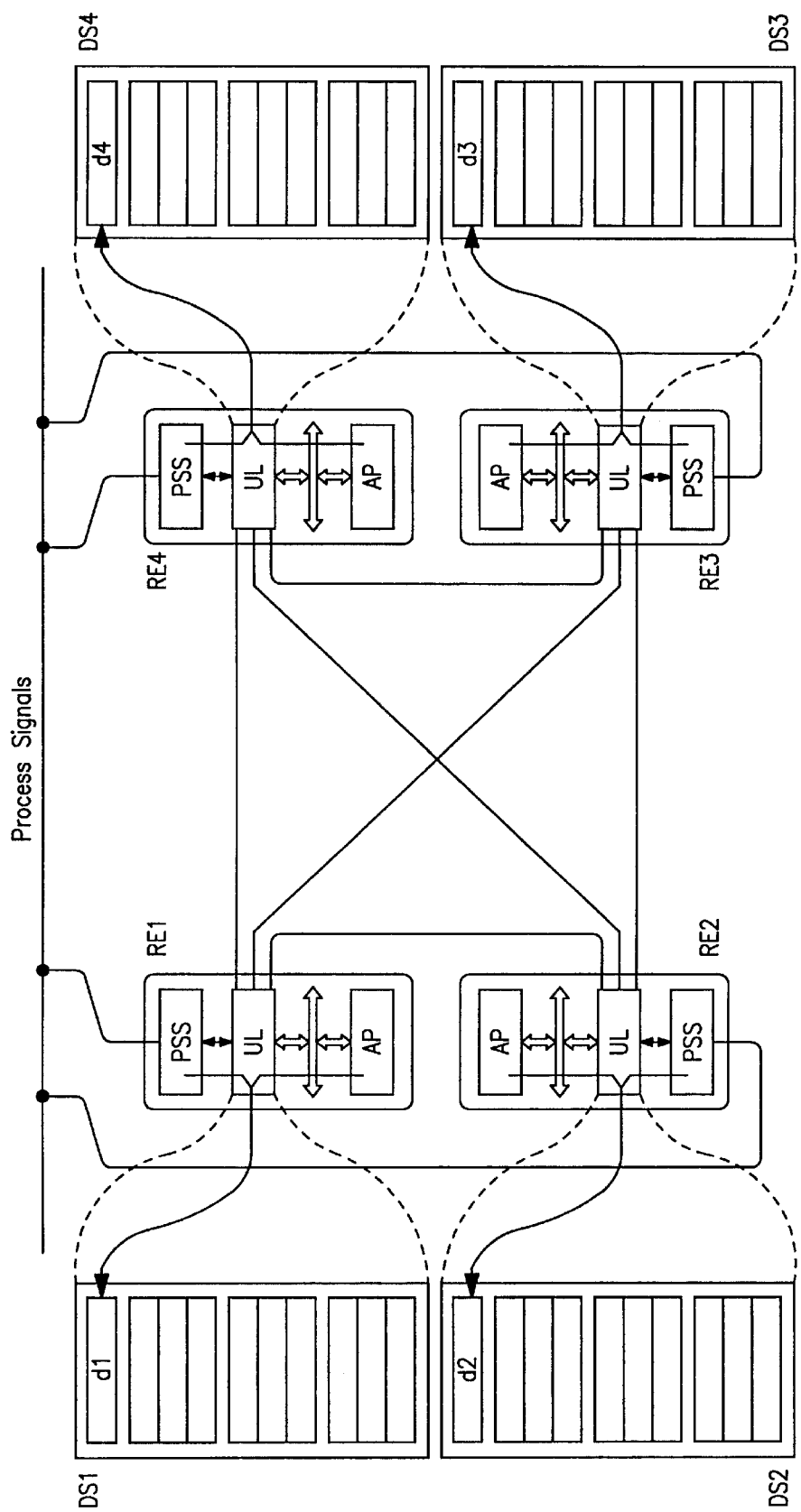

The original data produced in the computer unit or, respectively, data d1 to d4 in-read by a process interface PSS are initially taken up in the respectively associated data storages DS1 to DS4, in accordance with FIG. 5a.

Subsequently, each computer unit transfers, in a first data distribution cycle in accordance with FIG. 5b, its original data d1 to d4 to each other computer unit, into the associated data storage. At the conclusion of this distribution cycle, thus, each data storage contains, in accordance with FIG. 5a, the in-read, inherent data d1; d2; d3; d4, as well as the d1/RE1; d2/RE2; d3/RE3; d4/RE4 identified data, respectively, of the other computer units.

Figure 5B:
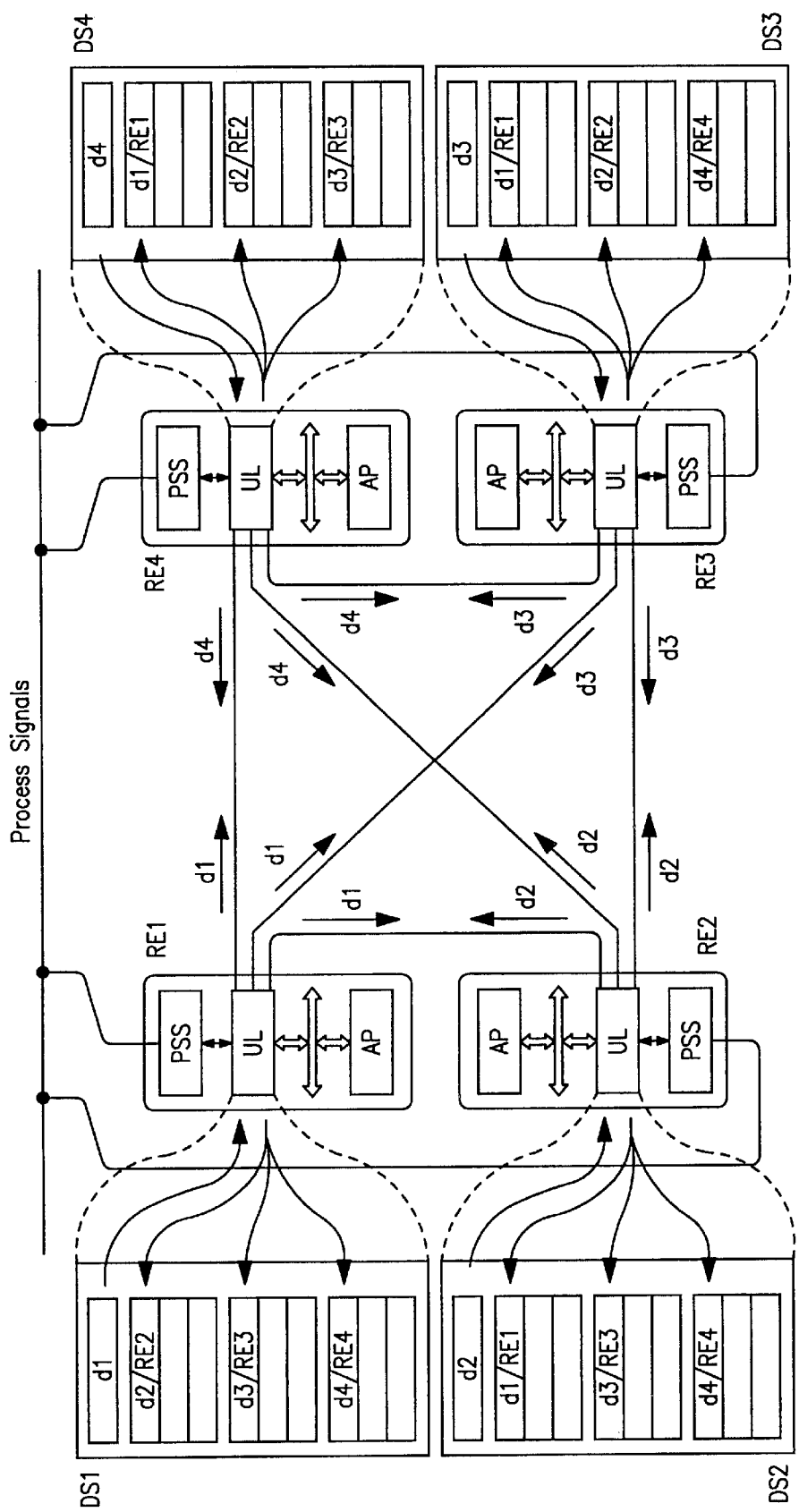

In a second data distribution cycle in accordance with FIG. 5c, each computer unit then transfers all data obtained according to FIG. 5b into the data storages of those two computer units which did not already obtain data in the original condition in accordance with FIG. 5a. Thus, at the conclusion of this distribution cycle, each data storage DS1, DS2, DS3 and DS4 contains its own or inherent data in accordance with FIG. 5a as well as, respectively, three blocks of data DB1, DB2 and DB3, whereby the original data di are contained in a transferred block of data of the three other computer units, respectively, from another one of the three computer units REi.

The evaluation is then carried out in each computer unit respectively through a first comparison of the three data within each block of data for bitwise identity, and in a second comparison of the blocks of data DB1 to DB3 among one another, as well as with the respective original data in accordance with FIG. 5a, for identity, whereby congruent (i.e., bit-identical) and quasi-congruent identity (i.e., identity within a tolerance range) can be differentiated. When through the subsequent evaluation of the results of comparison, by means of the known Byzantine algorithm, a fault-containing computer unit is identified, the computer unit then produces and transfers a deactivating signal to the computer unit identified as being fault-containing. When this computer unit receives from all three other computer units a deactivating signal, this computer unit is deactivated.

FIG. 6 shows an assembly of four computer units 20a, 20b, 20c, and 20d (RE1, RE2, RE3, RE4), each having a logic unit 30a, 30b, 30c, or 30d (BSL), at least one of which logic units 30a, 30b, 30c, and 30d may be represented by reference numeral 30. These computer units 20a to 20d are connected, as those shown in FIG. 5, with process signal lines 1, 2, 3, 4, and 5 for input and output of process data. The data lines 6, 7, 8, 9, 10, and 11 form, as in FIG. 5, bi-directional connections between the computer units 20a to 20d (RE1 to RE4) for the transmission of data and deactivating signals. The lines 1, 2, 3, 4, 5, 6, 7, 8, 9, 10, and 11 shown in FIG. 6 can be found again in corresponding manner in FIGS. 6a, 6b, and 6c, with the identifications by reference numerals as described hereinbelow.

Each computer unit 20a, 20b, 20c, 20d (RE1 to RE4) has a logic unit BSL (30a, 30b, 30c, 30d) which are connected to inputs identified by the relative identification +1, +2, +3 and to outputs, via data lines 6, 7, 8, 9, 10, 11. In the computer units 20a to 20d shown in FIG. 6, the logic units 30a to 30d (BSL) are respectively connected to a microprocessor, which may be represented by at least one of reference numerals 32a, 32b, 32c, and 32d, as was explained above with reference to FIG. 1. Furthermore, the multiplex function realized in the logic units 30a to 30d (BSL) is shown schematically by blocks 41a, 41b, 41c, and 41d (MX). Each logic unit 30a to 30d (BSL) has a register set 52a, 52b, 52c, and 52d (RS1, RS2, RS3, or RS4) and, in accordance with FIG. 2, includes the registers 49a to 49j (SR1 to SR10).

The individual steps of the data distribution, in accordance with the invention and as just described, are shown in FIGS. 6a to 6c. When comparing the representation in FIG. 6c and the representation of known computers according to FIG. 5c, it may be essentially clear that the contents of all four register sets 52a to 52d (RS1 to RS4), on conclusion of the data distribution cycle, are essentially the same (FIG. 6c), whereby, however, the data storages DS1 to DS4 (FIG. 5c) have differing contents—every time fault-free data being a precondition. Thus, there is done without an individual data evaluation in the computer unit 20 or, respectively, the logic unit 30 in accordance with at least one possible embodiment of the present invention, which may be a requirement in known computer units. This may provide the advantage that in contrast to the architecture of a known fault tolerant assembly, the assembly in accordance with at least one possible embodiment of the present invention can be realized using identical computer units 20 or, respectively, logic units 30, independently of their physical position of use in the computer assembly.

The circuitry shown in FIG. 3 of the computer units 20 is to be provided, along the just-described data lines, also for deactivating lines (not shown). In FIG. 1 these lines are shown as input line 34 and output lines 35a to 35m and 63a, 63b, and 63c of the logic unit 30 (BSL).

FIG. 4 shows a principle of the comparison and the evaluation of the in-read data as well as data blocks 55a, 55b, and 55c (DB1 to DB3). For the determination of identities, a plurality of comparators 46a, 46b, 46c, 46d, 46e, 46f, 46g, 46h, 46i, 46j, 46k, 46l, and 46m are provided. These are arranged in such a manner that for a data block DBi (55) there is created an inner comparator ring, comprised of three comparators 46c, 46d, 46e (K3, K4, K5) or, respectively, 46g, 46h, 46i (K7, K8, K9) or, respectively, 46k, 46l, 46m (K11, K12, K13), as well as an outer comparator ring, comprised of the four comparators 46a, 46b, 46f, 46j (K1, K2, K6 and K10), which outer comparator ring combines the three inner comparator rings and the register 49a (SR1) with one another.

The contents of the first and tenth registers 49a, 49j (SR1, SR10) are compared with a first comparator 46a (K1). The contents of the first and second registers 49a, 49b (SR1, SR2) are compared with a second comparator 46b (K2). The contents of the second and third registers 49b, 49c (SR2, SR3) are compared with a third comparator 46c (K3). The contents of the third and fourth registers 49c, 49d (SR3, SR4) are compared with a fourth comparator 46d (K4). The contents of the second and fourth registers 49b, 49d (SR2, SR4) are compared with a fifth comparator 46e (K5).

In corresponding manner, a sixth comparator 46f (K6) serves to compare the contents of the fourth register 49d (SR4) with the fifth register 49e (SR5). A seventh comparator 46g (K7) compares the contents of the fifth and sixth registers 49e, 49f (SR5, SR6). An eighth comparator 46h (K8) compares the contents of the sixth and seventh registers 49f, 49g (SR6, SR7). A ninth comparator 46i (K9) compares the contents of the fifth and seventh registers 49e, 49g (SR5, SR7).

Finally, a tenth comparator 46j (K10) serves to compare the contents of the seventh register 49g (SR7) with the eighth register 49h (SR8). An eleventh comparator 46k (K11) compares the contents of the eighths and ninth registers 49h, 49i (SR8, SR9). A twelfth comparator 46l (K12) compares the contents of the ninth and tenth registers 49i, 49j (SR9, SR10). A thirteenth comparator 46m (K13) compares the contents of the eighth and tenths registers 49h, 49j (SR8, SR10).

The outputs of the comparators 46a to 46m (K1 to K13) are connected with an evaluation logic 56 (BL) which can initiate, in the event of a fault, on the one hand, deactivating signals 67a, 67b, and 67c and which, on the other hand, sends the identification of the registers with fault-free data to the microprocessor 32. For out-reading of the register contents, all registers are connected to the data bus (not shown) of the microprocessor 32.

The comparison of data is done in two logical steps, whereby in a first comparison, with the aid of the inner comparator rings 46c, 46d, 46e (K3, K4, K5) or, respectively, 46g, 46h, 46i (K7, K8, K9) or, respectively, 46k, 46l, 46m (K11, K12, K13), the data d+i within a block of data (55) DBi, which with respect to origin arise from the same logic unit 30, shown in FIG. 1, or, respectively, computer unit 20 RE+i, shown in at least one of FIG. 1 and FIG. 3, but which were transmitted via different paths, are examined for bitwise identity. If in one of these comparisons no bitwise identity is found, a fault is present and, in accordance with the Byzantine algorithm, there is initiated the generation of a deactivating signal, one of 67a to 67c, to the fault-carrying logic unit 30, shown in FIG. 1, or, respectively, computer unit 20, shown in FIG. 1. When a logic unit 30 (shown in FIG. 1) or, respectively, computer unit 20 (shown in FIG. 1) receives three, or up to three, deactivating signals 67, which deactivating signals may be represented by at least one of reference numerals 67a, 67b, and 67c, it is isolated from the computer assembly. When all data d+i within a pertaining or corresponding block of data (55, which may be represented by at least one of reference numerals 55a, 55b, 55c, and 55d) DBi are in bitwise manner identical, in a second comparison, with the aid of the outer comparator ring 46a, 46b, 46f 46j (K1, K2, K6, K10), the contents of the blocks of data (55), as well as the contents of the register 49a (SR1), are compared with one another, whereby between congruent (all register contents are identical in bitwise manner) and quasi-congruent (bitwise identical in the first comparisons, but among each other differing) data can be differentiated. In the case of congruent data, no fault is present and no deactivation signal 67, which may be represented by at least one of the reference numerals 67a, 67b, and 67c, is generated; in the case of quasi-congruent data, the evaluation of such data is subject to the application which, as required, can also generate, as required, initiation of a deactivating signal, one of 67a to 67c.

In the left-hand portion of FIG. 4 are shown again additional registers 50a, 50b, 50c, 50d (SR1a, SR2a, SR6a and SR10a), the contents of which are also compared with one another by way of comparators 58a, 58b, 58c, and 58d (ZK1 to ZK4). The outputs of the comparators 58a to 58d are connected to a selection logic 59 (AL), with which is done a pre-selection of the multiplex channel 41 which needs to be switched, in the manner of a through-line, as the next following description.

One feature of the invention resides broadly in a super computer comprising: memory apparatus for storing data; hardware for processing data; software for running said hardware, said computer further comprising: (a) a plurality of at least four logic units, hardware-connected to one another; (b) each logic unit having at least one register, into which data can be read, data can be stored, and data can be read from; apparatus for controlling flow of data between said logic units in substantially synchronous manner through flow of data between said logic units; output apparatus for reading data from said registers, operatively connected to each logic unit; input apparatus for reading data into said registers operatively connected to each logic unit; and interconnecting circuitry to operatively connect said output apparatus with said logic units, said interconnecting circuitry being configured as hardware connection to tolerate an amount of F faults in conformity with the Byzantine algorithm, for processing valid data and for generating a signal for deactivating a fault-containing logic unit.

Another feature of the invention resides broadly in a computer comprising: a plurality of at least four logic units, hardware-connected to one another; (b) each logic unit having at least one register, into which data can be read, data can be stored, and data can be read from; apparatus for controlling flow of data between said logic units in substantially synchronous manner through flow of data between said logic units; output apparatus for reading data from said registers, operatively connected to each logic unit; input apparatus for reading data into said registers operatively connected to each logic unit; and interconnecting circuitry to operatively connect said output apparatus with said logic units, said interconnecting circuitry being configured as hardware connection to tolerate an amount of F faults in conformity with the Byzantine algorithm.

Some examples of systems that measure operating parameters and learn therefrom and that may be used or adapted for use in at least one possible embodiment of the present invention may be found in the following U.S. patents: U.S. Pat. No. 5,770,934, issued to inventor Theile on Jun. 13, 1998; U.S. Pat. No. 5,191,272, issued to inventors Torii et al. on Mar. 2, 1993; U.S. Pat. No. 5,223,820, issued to inventors Sutterlin et al. on Jun. 29, 1993; and U.S. Pat. No. 4,655,188, issued to inventors Tomisawa et al. on Apr. 7, 1987.

Some examples of microprocessors that may be used or adapted for use in at least one possible embodiment of the present invention may be found in the following U.S. patents: U.S. Pat. No. 5,770,934, issued to inventor Theile on Jun. 23, 1998; U.S. Pat. No. 5,479,151, issued to inventors Lavelle et al. on Dec. 26, 1995; U.S. Pat. No. 5,453,736, issued to inventor Noren on Sep. 26, 1995; U.S. Pat. No. 5,437,174, issued to inventor Aydin on Aug. 1, 1995; U.S. Pat. No. 5,274,312, issued to inventor Gertsenkorn on Dec. 28, 1993; and U.S. Pat. No. 5,140,173, issued to inventors Chau et al. on Aug. 18, 1992.

Some examples of databuses or databus systems that may be used or adapted for use in at least one possible embodiment of the present invention may be found in the following U.S. patents: U.S. Pat. No. 6,008,546, issued to inventor Sage on Dec. 28, 1999; U.S. Pat. No. 5,978,193, issued to inventor Kaaden on Nov. 2, 1999; U.S. Pat. No. 5,815,732, issued to inventors Cooper et al. on Sep. 29, 1998; U.S. Pat. No. 5,507,001, issued to inventor Nishizawa on Apr. 9, 1996; and U.S. Pat. No. 5,402,423, issued to inventors Van Kersen et al. on Mar. 28, 1995.

The components disclosed in the various publications, disclosed or incorporated by reference herein, may be used with at least one possible embodiment of the present invention, and may be found in the following U.S. patents: U.S. Pat. No. 4,569,015 to Dolev et al.; U.S. Pat. No. 4,748,617 to Drewlo; U.S. Pat. No. 4,805,107 to Kieckhafer et al.; U.S. Pat. No. 4,816,989 to Finn et al.; U.S. Pat. No. 4,849,979 to Maccianti, et al.; U.S. Pat. No. 5,107,416 to Jippo et al.; U.S. Pat. No. 5,117,442 to Hall; U.S. Pat. No. 5,157,663 to Major et al.; U.S. Pat. No. 5,200.915 to Hayami et al.; U.S. Pat. No. 5,206,952 to Sundet et al.; U.S. Pat. No. 5,239,641 to Horst; U.S. Pat. No. 5,269,016 to Butler et al.; U.S. Pat. No. 5,271,013 to Gleeson; U.S. Pat. No. 5,325,517 to Baker et al.; U.S. Pat. No. 5,327,550 to Pribnow; U.S. Pat. No. 5,349,654 to Bond et al.; U.S. Pat. No. 5,353,436 to Horst; U.S. Pat. No. 5,355,528 to Rosska et al.; U.S. Pat. No. 5,455,932 to Major et al.; U.S. Pat. No. 5,557,623 to Discoll; U.S. Pat. No. 5,598,529 to Garay et al.; U.S. Pat. No. 5,600,784 to Bissett et al.; U.S. Pat. No. 5,630,046 to Loise; U.S. Pat. No. 5,768,493 to Kumar; U.S. Pat. No. 5,790,397 to Bissett et al.; U.S. Pat. No. 5,802,265 to Bressoud et al.; U.S. Pat. No. 5,822,512 to Goodrum et al.; U.S. Pat. No. 5,838,899 to Leavitt et al.; U.S. Pat. No. 5,848,286 to Schiffleger et al.; U.S. Pat. No. 5,903,717 to Wardrop; U.S. Pat. No. 5,923,512 to Brownlow et al.; U.S. Pat. No. 5,948,112 to Shimada et al.; U.S. Pat. No. 5,949,778 to Abu-Amara et al.; U.S. Pat. No. 5,956,474 to Bissett et al.; U.S. Pat. No. 5,968,185 to Bressoud et al.; U.S. Pat. No. 5,996,089 to Mann et al.; U.S. Pat. No. 6,018,810 to Olarig; U.S. Pat. No. 6,026,092 to Abu-Amara et al.; U.S. Pat. No. 6,032,267 to Fishler et al.; and U.S. Pat. No. 6,038,685 to Bissett et al.

The features disclosed in the various publications, disclosed or incorporated by reference herein, may be used in the embodiments of the present invention, as well as equivalents thereof.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following patents, patent applications, or patent publications are hereby incorporated by reference as if set forth in their entirety herein as follows: DE 44 01 168 C 2, having inventor Gerhard Urban, filed on Jan. 17, 1994, issued on Jun. 27, 1996, and "The Byzantine Generals Problem", written by Leslie Lamport, Robert Shostak and Marshall Pease, all of SRI International, and published in *ACM Transactions on Programming Languages and Systems* Vol. 4, No. 3, July 1982, pages 382–401.

The corresponding foreign patent publication applications, namely, Federal Republic of Germany Patent Application No. DE 199 21 179.5, filed on May 7, 1999, having inventor Dipl.-Ing. Volker Brinkmann, which inventor has address Brinkumer Strasse 28a, D-28844 Weyhe, Federal Republic of Germany, and having applicant DaimlerChrysler Aerospace AG, which applicant has address Willy-Messerchmitt-Strasse 1, D-85521 Ottobrunn, entitled "Logikeinheit nach byzantinen Algorithmus, Rechnereinheit mit solcher Logikeinheit, Verbund aus Logik-oder Rechnereinheiten und Verfahren zum Betrieben eines solchen Verbunds", and DE-OS 199 21 179.5 and DE-PS 199 21 179.5, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to the patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses, if any, are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A supercomputer comprising a plurality of logic units, said plurality of logic units being configured to tolerate an amount F of errors in simultaneous manner as to time and being capable of operating under the instructions of the Byzantine algorithm, at least one of said plurality of logic units comprising:
    (a) a plurality of inputs (+0, +1, +2, +3) for the in-reading of data into registers (SR1 to SR10) of a set of registers;
    (b) a plurality of outputs (+1, +2, +3) for out-reading of data from the registers (SR1 to SR10);
    (c) each output (+1, +2, +3) being connectable with an input (+1, +2, +3) of a further logic unit (BSL); and
    (d) the registers (SR1 to SR10) being connected with the last-mentioned inputs (+1, +2, +3) and with outputs (+1, +2, +3) in such a manner that each register (SR1 to SR10) is capable of in-reading and out-reading, independently of the position of the logic unit (BSL) within the assembly, by means of a position invariant, relative identification.

2. The supercomputer according to claim 1, wherein said at least one of said plurality of logic units has a plurality of deactivating lines for transmission of deactivating signals to further logic units or, respectively, for receiving of deactivating signals from further logic units (BSL), when a fault has been recognized.

3. The supercomputer according to claim 2, wherein said at least one of said plurality of logic units is configured to have self-synchronizing capability, upon activation, particularly initial activation or re-activation, to one of several further logic units (BSL) under assistance of cyclic data communication.

4. The supercomputer according to claim 3, wherein said at least one of said plurality of logic units is configured, on the basis of a deactivating status, to exclude or include data of a further logic unit (BSL) in data distribution and in data analysis.

5. The supercomputer according to claim 4, wherein said at least one of said plurality of logic units is configured with a plurality of comparators (K1 to K13) for comparing of the contents of the registers (SR1 to SR10) and an evaluation logic (BL) with which (BL), in the event of deviation from or, respectively, exceeding of a permissible deviation, a deactivating signal can be produced in respect of a logic unit (BSL) which is recognized as being fault-containing.

6. The supercomputer according to claim 5, wherein said at least one of said plurality of logic units is configured with a multiplex function (MX) which, in particular, is adapted to be synchronized with the further logic units (BSL), via the data transfer between the logic units (BSL), for the selection of process data, which data is capable of being introduced, via several channels, particularly, process input signals and/or process output signals which are being introduced as loop-back input signals.

7. The supercomputer according to claim 6, wherein each logic unit (BSL) has a plurality, particularly, 3F+1, of additional registers (SR1$a$, SR2$a$, SR6$a$, SR10$a$).

8. The supercomputer according to claim 7, wherein said at least one of said plurality of logic units has a plurality of switches (Z1 to Z3) which are positioned between the inputs (+1, +2, +3) and registers and on deactivation of a further logic unit (BSL) which in-reads again data read-out of the registers (SR1 to SR10), instead of the data of the deactivated logic unit (BSL) for storing valid data again in the affected registers (SR1 to SR10).

9. The supercomputer according to claim 8, wherein said at least one of said plurality of logic units has further switches (S1, S2, S3) which are arranged between the outputs (+1, +2, +3) and registers (SR1 to SR10; SR1$a$, SR2$a$, SR6$a$, SR10$a$), wherein each one of these switches (S1, S2, S3) can connect an output (+1, +2, +3) with one of a plurality of registers (SR1 to SR10; SR1$a$).

10. The supercomputer according to claim 9, wherein for said at least one of said plurality of logic units the amount F of tolerable faults is equal to one, a set of registers exhibits ten registers (SR1 to SR10), particularly hardware shift registers, and four additional registers (SR1$a$, SR2$a$, SR6$a$, SR10$a$), 13 comparators (K1 to K13) for data comparison, four inputs (+0, +1, +2, +3) for in-reading, and three outputs for out-reading of data, as well as three deactivating lines are provided.

11. The supercomputer according to claim 10, further comprising a computer unit, said computer unit comprising a microprocessor (MP) connected to the logic unit (BSL), wherein the microprocessor (MP) is configured for processing of in-read data sets or data sentences, for examining particularly quasi-congruent data for possible faults, and for initiating generation of a deactivating signal.

12. The supercomputer according to claim 11, wherein said computer unit further comprises data lines (loop-back) for connecting outputs for process output signals, with inputs for process input signals, for return of output data to these inputs.

13. The supercomputer according to claim 12, wherein said computer unit further comprises at least one input-/output unit with a comparator and an output switch (AS), which issues only in the closed condition for the transferred data as process output signals, whereby the comparator serves for comparing the data issued as the process output signals, with those issued to the output transferred data, and the result of comparison, as component of the input data, is distributable and verifiable according to the Byzantine algorithm.

14. The supercomputer according to claim 13, wherein said computer unit further comprises a connecting logic by way of which the microprocessor (MP), by means of the logic unit (BSL), has coordinated access to process data.

15. The supercomputer according to claim 14, further comprising a fault tolerant assembly of at least 3F+1 identically configured logic units of said plurality of logic units or computer units (RE), whereby the inputs and outputs of the logic units (BSL) or, respectively, the computer units (RE) are connected to one another that corresponding registers (SR1 to SR10) of different logic units (BSL) or, respectively, computer units (RE) exhibit data (d+i/RE+j) of the same relative identification of the origin (d+i) and the transferring computer unit (RE).

16. The supercomputer according to claim 15, wherein the relative identification is done by a cyclic, particularly, cyclically ascending, modulo (3F+1) check.

17. The supercomputer according to claim 16, wherein the logic units (BSL) or, respectively, computer units (RE) can be synchronized via data exchange taking place between the logic units (BSL) or, respectively, computer units (RE).

18. A method of operating a supercomputer, said supercomputer comprising at least 3F+1 logic units, said logic units being configured to tolerate an amount F of errors in simultaneous manner as to time and being capable of operating under the instructions of the Byzantine algorithm, at least one of said logic units comprising: (a) a plurality of inputs (+0, +1, +2, +3) for the in-reading of data into registers (SR1 to SR10) of a set of registers; (b) a plurality of outputs (+1, +2, +3) for out-reading of data from the registers (SR1 to SR10); (c) each output (+1, +2, +3) being connectable with an input (+1, +2, +3) of a further logic unit (BSL); and (d) the registers (SR1 to SR10) being connected with the last-mentioned inputs (+1, +2, +3) and with outputs (+1, +2, +3) in such a manner that each register (SR1 to SR10) is capable of in-reading and out-reading, independently of the position of the logic unit (BSL) within the assembly, by means of a position invariant, relative identification; or said supercomputer comprising computer units, each of said computer units comprising a microprocessor (MP) connected to a logic unit (BSL), wherein the microprocessor (MP) is configured for processing of in-read data sets or data sentences, for examining particularly quasi-congruent data for possible faults, and for initiating generation of a deactivating signal, whereby F is the amount of faults which are to be tolerable at the same time, with F+1 data distributing cycles, wherein the in-read data during in-reading and for distribution are configured with a relative identification wherein the relative identification of the data in corresponding registers (SR1 to SR10) of the various logic units (BSL) or, respectively, computer units (RE), is identical.

19. The method in according to claim 18, wherein the relative identification is done by a cyclic, particularly cyclically increasing, modulo (3F+1) check.

* * * * *